United States Patent
Dolinar et al.

(10) Patent No.: US 10,392,756 B2
(45) Date of Patent: Aug. 27, 2019

(54) ROADWAY MARKER CONTROL SYSTEM

(71) Applicant: LimnTech LLC, Souderton, PA (US)

(72) Inventors: Douglas D. Dolinar, Doylestown, PA (US); William R. Haller, Bethlehem, PA (US); Matthew W. Smith, Towanda, PA (US); Charles C. Stahl, Matawan, NJ (US)

(73) Assignee: LimnTech LLC, Souderton, PA (US)

( * ) Notice: Subject to any disclaimer, the term of this patent is extended or adjusted under 35 U.S.C. 154(b) by 180 days.

(21) Appl. No.: 15/548,356

(22) PCT Filed: Feb. 8, 2016

(86) PCT No.: PCT/US2016/017000
§ 371 (c)(1),
(2) Date: Aug. 2, 2017

(87) PCT Pub. No.: WO2016/127174
PCT Pub. Date: Aug. 11, 2016

(65) Prior Publication Data
US 2018/0016758 A1     Jan. 18, 2018

Related U.S. Application Data

(60) Provisional application No. 62/288,682, filed on Jan. 29, 2016, provisional application No. 62/113,086, filed on Feb. 6, 2015.

(51) Int. Cl.
*E01C 23/16* (2006.01)
*B62D 5/06* (2006.01)
*E01C 23/20* (2006.01)

(52) U.S. Cl.
CPC .............. *E01C 23/163* (2013.01); *B62D 5/06* (2013.01); *E01C 23/20* (2013.01)

(58) Field of Classification Search
CPC .......... E01C 23/163; E01C 23/20; B62D 5/06
See application file for complete search history.

(56) References Cited

U.S. PATENT DOCUMENTS

| | | |
|---|---|---|
| 6,074,693 A | 6/2000 | Manning |
| 2013/0190981 A1* | 7/2013 | Dolinar .................. B60R 11/04 |
| | | 701/41 |

OTHER PUBLICATIONS

International Search Report issued by the European Patent Office for International Application No. PCT/US2016/017000 dated May 2, 2016.

\* cited by examiner

*Primary Examiner* — Yuen Wong
(74) *Attorney, Agent, or Firm* — Stradley Ronon Stevens & Young, LLP

(57) ABSTRACT

A GPS-based control system for positioning a nozzle projection onto a predetermined roadway mark path includes a vehicle having an attached paint carriage which is laterally movable with respect to the vehicle, a first GPS antenna, a first GPS receiver responsive to the first GPS antenna, a first signal processor for determining the geographical location of the first GPS antenna, a linear motion and position sensor, a GPS location processor for determining the absolute GPS location of the paint carriage, a coordinate transform processor for transforming the absolute GPS location of the paint carriage into a location in a coordinate system other than GPS, a comparator for comparing the location of the paint carriage in the other coordinate system to a desired roadway mark path according to the other coordinate system, and a control system for positioning the nozzle projection onto the roadway mark path.

18 Claims, 17 Drawing Sheets

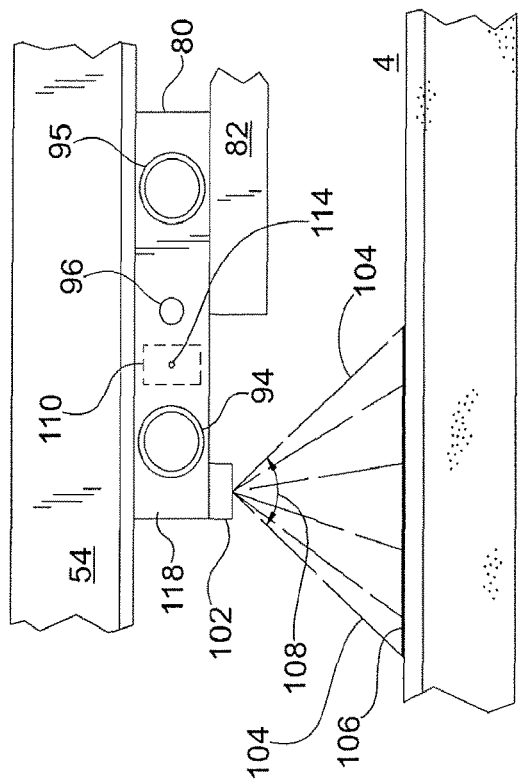
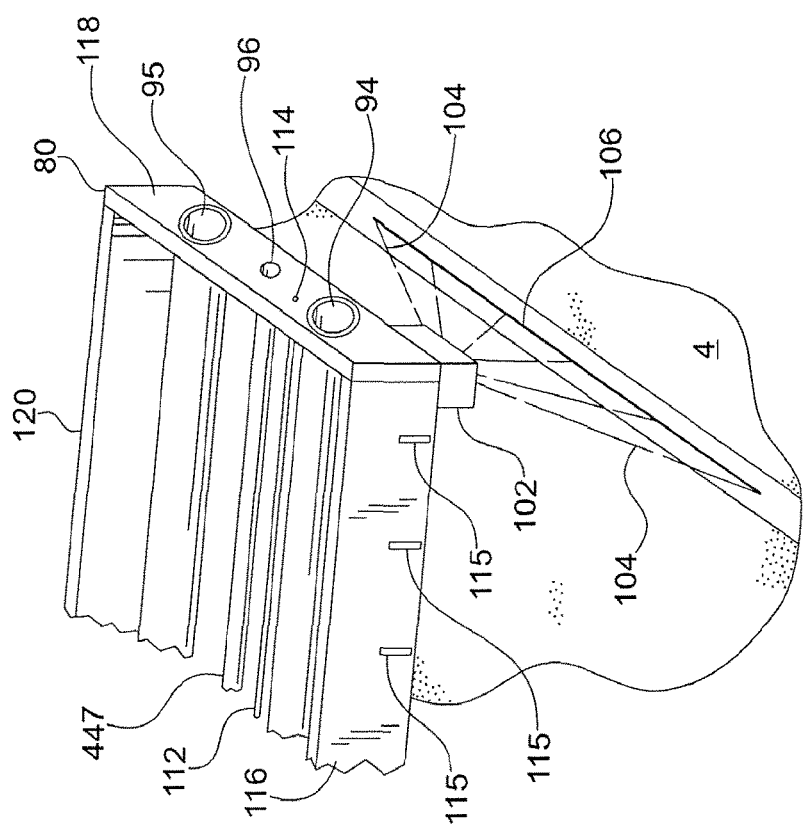

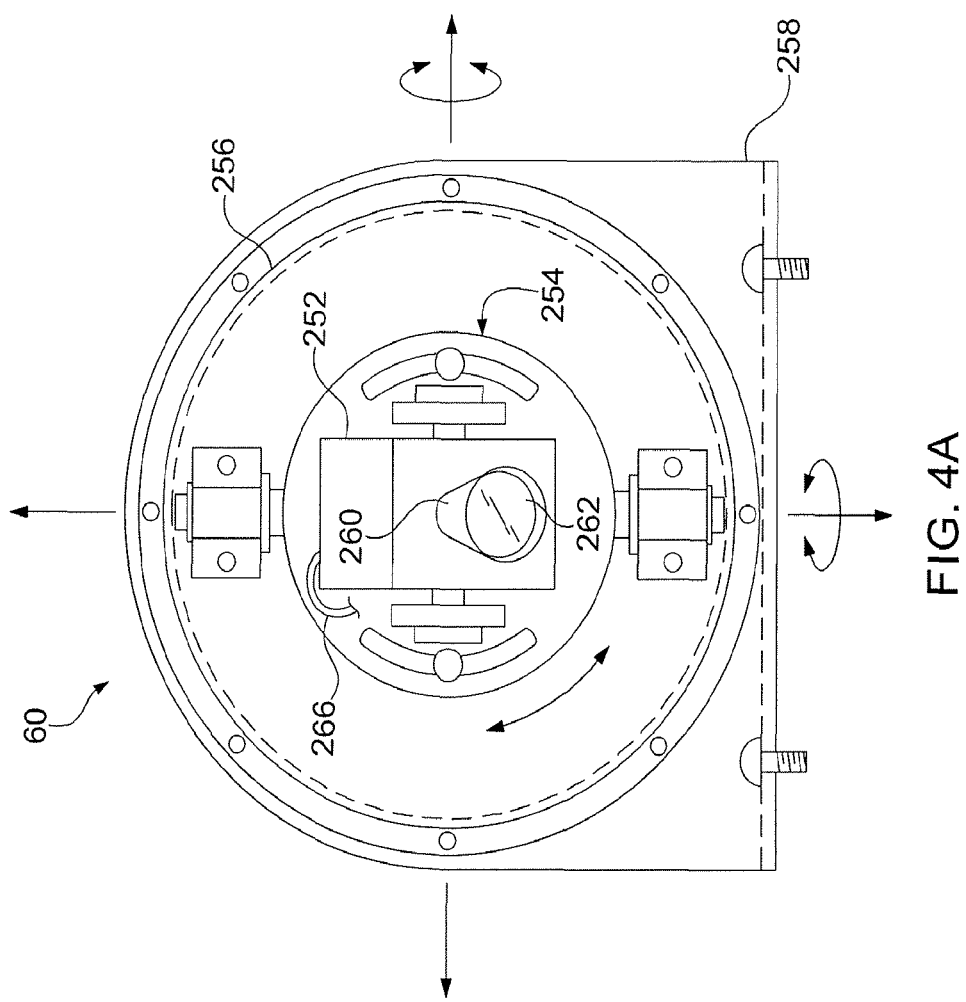

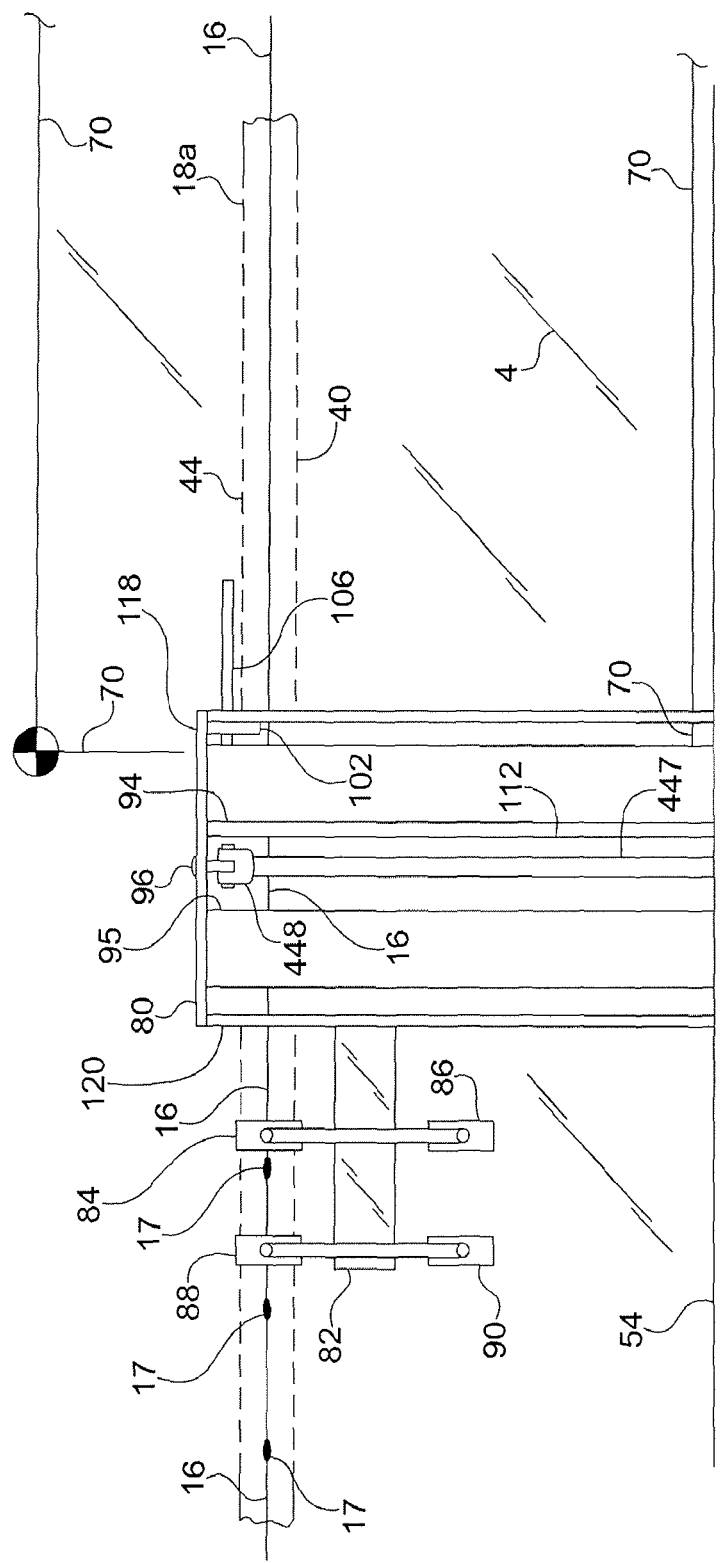

ID WAY MARKER CONTROL SYSTEM

ROADWAY MARKER CONTROL SYSTEM

RELATED APPLICATIONS

This application is the United States National Phase of International Application No. PCT/US2016/017000 filed on Feb. 8, 2016, which claims the benefit of priority to U.S. Provisional Patent Application Ser. No. 62/113,086 filed on Feb. 6, 2015, and U.S. Provisional Patent Application Ser. No. 62/288,682 filed on Jan. 29, 2016, the contents of which are incorporated in this application by reference.

FIELD OF THE INVENTION

The present invention relates generally to a GPS-based control system for accurately positioning a material dispensing carriage over a desired roadway location, and in particular to a GPS-based control system for accurately positioning roadway mark material dispensing nozzles over a predetermined roadway mark location to replicate a previous roadway mark. An example of the use of the system is provided for automating the layout tasks associated with replicating roadway marks on newly repaved/resurfaced roadways.

BACKGROUND OF THE INVENTION

New or repaved roadway surfaces almost always require the application of roadway surface markings as a mechanism for visually providing motorists with lane demarcation lines for controlling and directing traffic. In the past, the process of applying new roadway surface markings consisted of first manually determining the center of the roadway surface and painting small dots (visual indicia) to visually define the roadway center. A driver of a paint vehicle would then use the roadway center defined by the dots to guide a paint sprayer which would deposit paint along the path defined by the small dots.

Currently this task is accomplished by determining the center of the roadway at a first location point by manually measuring the width of the roadway and placing a mark at the center point. This process is then repeated to determine the center point of the roadway at a second point which is displaced from the first point. These two points now define the starting and ending points for a line segment which identifies the center path of the roadway. A chain is then stretched between the first and second center points and small white (or other colored) painted dots are manually sprayed and spaced along the stretched chain giving a visual indication of the center line of the roadway. The chain or string line is then removed from the roadway surface. This entire process is then repeated for the next segment of the roadway using the ending position of the first segment as the starting position for the second segment. This process is continuously repeated until the location of the center of the entire roadway has been defined. The roadway center line is used as a reference to define the roadway mark path (i.e., the roadway center line defines the mark path). Single line roadway marks (solid or dashed) are usually positioned in close proximity to the roadway mark path (i.e., the center of the roadway). Double line roadway marks (for example, a conventional double yellow line pattern) are usually symmetrically placed on either side of the roadway center.

Having defined the position of the center of the roadway, a truck equipped with line painting equipment is positioned over the white dots. The driver of the truck then uses the white dots as a visual guide along with a pointer for coarsely positioning the truck over the defined segments. A second operator sits at the rear of the truck and positions a side moveable paint carriage directly over the dots for all defined segments of the roadway center. The side moveable carriage allows the second operator to apply the roadway marking at the desired location and to correct for any slight misalignment of the truck position with respect to the guide dots. A controlled paint spray nozzle array positioned on the side moveable carriage then applies the paint onto the roadway surface as the truck follows each center segment of the roadway. As the truck follows the mark path (the center of the roadway), the nozzle array applies the desired roadway mark (e.g., a single or multiple, solid or dashed, roadway marking at the desired location) which may be offset from the mark path.

Current systems for applying roadway markings are manually intensive and place the personal safety of workers at significant risk. For example, two workers are required to measure the starting and ending position of the segments, and two workers are required to actually paint the roadway markings (one worker is required to drive the truck and the other worker is required to operate both the carriage and paint dispensing equipment). In addition, to minimize the impact of applying the roadway surface markings to actively traveled roads and highways, the application of roadway markings is usually done in the late evening hours. During this time, traffic visibility is impeded and there is a significant potential for oncoming traffic to collide with those workers manually defining the starting and ending positions for each segment.

Previous attempts to automate the process of marking roadways included guiding the road marking equipment along a predetermined mark path using electromagnetic beams. Unfortunately, these methods required the placement of transmitters along the roadway. Other previous attempts have included the use of light beams arranged in a manner to define the proper path. Again, this attempt proved difficult to implement because of sunlight interference. Other attempts have included using radioactive marking material which would emit a characteristic fingerprint to define the roadway mark path. There are many disadvantages with using radioactive marking material, including health and safety issues, longevity (half-life) of the radioactive material, and disposal problems.

Other attempts to re-mark roadway surfaces have included using a drawing application program in combination with a global positioning system (GPS)-based paint sprayer. A drawing pattern is created using the application program and geographical coordinates for the pattern which are manually defined and then used by the GPS paint sprayer to mark the roadway surface. This attempt requires that the drawing pattern for the roadway be predetermined and fails if the exact location of the roadway marking is inaccurately defined, or if the drawing pattern does not correspond exactly with the geographical position of the actual roadway.

U.S. Pat. Nos. 6,074,693 and 6,299,934 (related to the '693 patent as a divisional) each disclose one example of a paint sprayer for marking roadways and fields with a drawing pattern. Both issued to Manning and titled "Global Positioning System Controlled Paint Sprayer," the '693 and '934 patents teach a system having an external computer and a GPS paint sprayer. The drawing pattern is created by a designer using either a geographical information system (GIS) which runs, or drawing application programs which run, on the external computer. A print file of the drawing pattern is created by the operating system software and is passed to the GPS paint sprayer. The print file may contain the geographical mapping of pixel data; instead, the geographical mapping of the pixel data may be completed within the GPS paint sprayer. In either case, the geographical mapping of the drawing image is determined and then stored in memory within the GPS paint sprayer. The GPS paint sprayer further includes a GPS receiver and a location comparator. The GPS receiver determines the geographical location of the GPS paint sprayer and the location comparator determines if a match occurs between the current GPS location of the paint sprayer and the geographical mapping of the drawing image. If a location match between the current GPS location of the GPS paint sprayer and geographical mapping data of the drawing image is detected, a control signal is sent to a spray nozzle which deposits paint or other material at the match location. Both lines and picture-like drawings can be marked onto a surface using this patented system.

The current roadway marking technology has at least several problems. One problem is that a significant amount of manual labor is required to accurately paint lines on roadways, and as a result workers are placed in an unsafe working environment during the roadway marking process. Another problem with current technology is the inability to easily and quickly obtain sampled geographical coordinates of the existing roadway line marks using GPS or GPS-based pseudolite arrays. A related problem is the inability to use this sampled data to generate a continuous function of the geographical coordinates for the entire mark path. Additional problems are the lack of an offsetting capability to determine other substantially parallel mark paths for line marking and, therefore, the inability to uniformly deposit paint or other material along the first (or second) mark path duplicating the previous mark.

The '693 patent expressly notes certain disadvantages with the current roadway marking technology. Under the heading "Description of the Prior Art" at column 1, lines 11-40, the '693 patent states: "Road markings are produced to a great extent with the assistance of so called 'road marking' machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like."

Although Manning identifies certain disadvantages with the known roadway marking technology, the GPS-controlled paint spray system disclosed by Manning in the '693 and '934 patents has its own disadvantages. First, a designer must generate a drawing and it must be assumed that the designer has accurately generated the drawing pattern. It must be further assumed that the actual constructed road matches the content of the drawing pattern. The system fails if a discrepancy exists between the actual and drawing pattern road position.

In addition, the disclosed system cannot maintain the accurate horizontal registration of the paint markings which is required when the drawing pattern does not accurately match the actual constructed roadway. This situation occurs where on-site construction changes are prompted by unforeseen construction problems. Such problems include, for example, bedrock formations, unstable ground structure, water runoff, and the like.

The designer using the system disclosed by Manning must determine and enter data corresponding to the reference geographical location for the center of the drawing, scaling information, orientation information, and other aspect ratio information to accurately determine the marking size and orientation. Thus, the system may require registration, orientation, and size input. The designer also must enter data manually for road markings, such as end points for a line, or an equation using known geographical location coordinates. This includes known coordinates from a previous survey. The system assumes that the designer can accurately determine geographical mark locations.

For an arc, the designer must select the end points and a radius. Such selection does not allow for a smoothly constructed functional fit. The designer must manually join line segments used to make a relatively long continuous painted line. The track line, which is a line, is produced from individual points and is not a smoothly derived curve from a mathematically derived function.

The system disclosed by Manning relies on an available equation. It does not sample pre-existing roadway marks (or produce a set of spaced points). The system does not record cross track position relative to a GPS receiver. The '693 patent does not disclose any mechanism for producing a curved line. Finally, the system disclosed by Manning paints only when there is a location match between the current GPS-based location and one of the data points in the geographical mark location data.

All of the above systems require accurate positioning of the nozzle over the desired geographical location of the mark (roadway mark or other type of mark). However, those systems that use GPS to position the nozzle(s) have limited positional accuracy unless the GPS-received signals are complemented with local-derived, real-time, kinematic (RTK) data, and even with RTK enhancements, positional accuracy is limited to approximately ten millimeters with stationary (non-moving) GPS measurements. This accuracy decreases significantly when GPS systems are mounted on moving vehicles which may experience changing pitch, roll and yaw displacements. For example, engine vibrations inherent in moving vehicles may directly impact the instantaneous GPS-determined position. For those roadway marking systems which use GPS to determine where to dispense roadway mark material onto a roadway surface, the accuracy of mark material placement is limited by the accuracy of the received GPS positional data and which may be corrupted by the movement of the dispensing vehicle.

Thus, there is a need in the industry for a GPS roadway surface marking system that requires less manual labor, increases the operational safety factor for workers, and is less expensive than the current roadway marking technology, and which will use an improved GPS-based control system to accurately, uniformly and smoothly mark repaved or resurfaced roadway surfaces from a moving vehicle.

BRIEF SUMMARY OF THE INVENTION

To overcome the shortcomings of current roadway marking technology, a new apparatus and method for placing actual roadway marks (including guiding visual indicia for later manual restriping of the roadway marks) on a repaved or resurfaced roadway are provided.

A basic object of the present invention is to provide an improved GPS-based control system for positioning a material dispensing carriage over a pre-determined roadway mark location.

An additional object of the invention is to provide an improved GPS-based control system for accurately positioning a material dispensing carriage over a pre-determined roadway mark location from a moving vehicle.

Another object of the invention is to provide an improved GPS-based control system for positioning roadway mark material dispensing nozzles over a pre-determined roadway mark location.

Another object of the invention is to provide an improved GPS-based control system for positioning roadway mark material dispensing nozzles over a pre-determined roadway mark location from a moving vehicle.

An additional object is to accurately deposit paint or other marking material (such as reflective glass beads or other reflective media) onto a repaved or resurfaced roadway replicating the pre-existing mark at locations determined by a continuous mark path.

An additional object is to accurately and smoothly deposit paint or other marking material (such as glass beads) onto a repaved or resurfaced roadway replicating the pre-existing mark at locations determined by a continuous mark path from a moving vehicle.

Another object is to provide an improved apparatus for automatically placing roadway marks (including guide indicia) onto repaved or resurfaced roadway surfaces.

Another object is to provide an improved apparatus for automatically placing roadway marks (including guide indicia) onto repaved or resurfaced roadway surfaces from a moving vehicle.

It is yet another object of the invention to accurately control the position of a moveable carriage using machine vision for imaging an offset corrected laser line in combination with a GPS locating system.

It is yet another object of the invention to accurately control the position of a moveable carriage using machine vision for imaging an offset corrected laser line in combination with a GPS locating system from a moving vehicle.

It is yet another object of the invention to accurately control the position of a moveable carriage having dispensing nozzles using an image system to image an offset corrected laser line in combination with a GPS locating system for dispensing roadway mark material onto a desired roadway geographical location.

It is yet another object of the invention to accurately control the position of a moveable carriage using a linear positioning sensor in combination with a GPS locating system.

It is yet another object of the invention to accurately control the position of a moveable carriage using a linear positioning sensor in combination with a GPS locating system from a moving vehicle.

It is yet another object of the invention to accurately control the position of a moveable carriage using a draw wire sensor in combination with a GPS locating system.

It is yet another object of the invention to accurately control the position of a moveable carriage using a draw wire sensor in combination with a GPS locating system from a moving vehicle.

It is yet another object of the invention to accurately control the position of a moveable carriage using an accurate GPS locating system.

It is yet another object of the invention to accurately control the position of a moveable carriage using an accurate GPS locating system from a moving vehicle.

It is yet another object of the invention to accurately control the position of a moveable carriage using a GPS locating system having one or more signal processors for filtering GPS data.

It is yet another object of the invention to accurately control the position of a moveable carriage using a GPS locating system having one or more signal processors for filtering GPS data from a moving vehicle.

It is yet another object of the invention to accurately control the position of a moveable carriage using a GPS locating system having a Bayesian model based filter for filtering GPS data.

It is yet another object of the invention to accurately control the position of a moveable carriage using a GPS locating system having a Bayesian model based filter for filtering GPS data from a moving vehicle.

It is yet another object of the invention to accurately control the position of a moveable carriage using a GPS locating system having Kalman filters for filtering GPS data.

It is yet another object of the invention to accurately control the position of a moveable carriage using a GPS locating system having a Bayesian model based filter for filtering and smoothing GPS data.

It is yet another object of the invention to accurately control the position of a moveable carriage using a GPS locating system having a Bayesian model based filter for filtering and smoothing GPS data from a moving vehicle.

It is yet another object of the invention to accurately control the position of a moveable carriage using a GPS locating system having Kalman filters for filtering and smoothing GPS data.

It is yet another object of the invention to use Bayesian model based filters, and in particular, Kalman and Kalman-like filters to provide an improved GPS-based control system to accurately position roadway mark material dispensing nozzles over a pre-determined roadway mark from a moving vehicle.

It is yet another object of the invention to accurately control the position of a moveable carriage using a GPS locating system having Kalman filters for filtering and smoothing GPS data from a moving vehicle.

It is still another object of the invention to accurately control the position of a moveable carriage using a GPS locating system which transforms GPS coordinates into a different coordinate system.

It is still another object of the invention to accurately control the position of a moveable carriage using a GPS locating system which transforms GPS longitudinal, latitude and altitude (LLA) coordinates into a different coordinate system.

It is still another object of the invention to accurately control the position of a moveable carriage using a GPS locating system which transforms GPS earth centered earth fixed (ECEF) coordinates into a different coordinate system.

It is still another object of the invention to accurately control the position of a moveable carriage using a GPS locating system which transforms GPS longitudinal, latitude and altitude (LLA) coordinates into a two dimensional coordinate system.

It is still another object of the invention to accurately control the position of a moveable carriage using a GPS locating system which transforms GPS longitudinal, latitude and altitude (LLA) coordinates into the Universal Transverse Mercator (UTM) coordinate system.

It is still another object of the invention to accurately control the position of a moveable carriage using a GPS locating system which transforms GPS earth centered earth fixed (ECEF) coordinates into a two dimensional coordinate system.

It is still another object of the invention to accurately control the position of a moveable carriage using a GPS locating system which transforms GPS earth centered earth fixed (ECEF) coordinates into the Universal Transverse Mercator (UTM) coordinate system.

Yet another object of the invention is to automatically create a second continuous roadway mark path substantially parallel to the original mark path. It is a further object of the invention to accurately deposit paint or other marking material onto a repaved roadway at the location determined by the second continuous roadway mark path.

It is another object of the invention to determine a continuous mark path based upon the sampled geographical mark path. It is still another object of the present invention to quickly determine the pre-existing roadway mark characteristics, pattern, and accurate geographical position.

It is still another object of the present invention to quickly determine the pre-existing roadway mark characteristics, pattern, and accurate absolute GPS geographical position.

It is yet another object of the invention to provide a system for guiding the driver of the roadway marking vehicle. The invention has as another object automatically guiding the paint vehicle along the mark path based upon a mark path continuous function.

According to one embodiment, a vehicle mounted GPS-based control system for positioning a projection of a material dispensing nozzle onto a predetermined roadway mark path located on a roadway surface is provided. The control system includes a vehicle having an attached paint carriage which is laterally movable which respect to the vehicle, a material dispensing nozzle attached to the paint carriage, a first GPS antenna mounted on the vehicle, a first GPS receiver responsive to the first GPS antenna, a first signal processor responsive to the first GPS receiver for determining the geographical location of the first GPS antenna, a linear motion and position sensor for determining the relative lateral linear displacement of the paint carriage with respect to the vehicle, a GPS location processor responsive to the first signal processor and to the linear motion and position sensor for determining the absolute GPS location of the material dispensing nozzle, a coordinate transform processor for transforming the absolute GPS location of the material dispensing nozzle into a location in a coordinate system other than GPS, a comparator for comparing the location of the material dispensing nozzle in the coordinate system other than GPS to a desired roadway mark path according to the coordinate system other than GPS, and a control system responsive to the comparator for controllably positioning the projection of the material dispensing nozzle onto the roadway mark path by laterally moving the paint carriage. The first signal processor may be configured to perform filtering operations on geographical data of the GPS antenna. The first signal processor may be configured to perform filtering operations on the geographical data of the GPS antenna which includes one or more of a rolling average, a rolling linear average, and a Gaussian weighted average over a number of GPS positional data. The first signal processor may be configured to perform Bayesian model based filtering operations on the geographical data of the first GPS antenna. The coordinate system other than GPS may be a Universal Transverse Mercator coordinate system or an East-North-Up coordinate system. The vehicle may further include second and third GPS antennas mounted on the vehicle, second and third GPS receivers responsive to the second and third GPS antennas, and second and third signal processors responsive to the second and third GPS receivers for determining the geographical location of the second and third GPS antennas. The coordinate transform processor may further transform a desired GPS roadway mark path into the desired roadway mark path according to the coordinate system other than GPS. The control system may include a hydraulic steering control unit. The hydraulic steering control unit may be electrically controllable. The comparator may be configured to produce an error signal based on the difference between the location of the material dispensing nozzle in the coordinate system other than GPS and the desired roadway mark path according to the coordinate system other than GPS, and the control system may be configured to move the paint carriage laterally to reduce the error signal.

In another embodiment, a method is provided for positioning a material dispensing nozzle which is attached to, and laterally movable with respect to, a vehicle onto a predetermined roadway mark path located on a roadway surface. The method includes determining the geographical location of a first GPS antenna mounted on the vehicle and responsive to a first GPS receiver using a first signal processor responsive to the first GPS receiver, determining the relative lateral displacement of the paint carriage with respect to the vehicle using a linear motion and position sensor, determining the absolute GPS location of the material dispensing nozzle using a GPS location processor responsive to the first signal processor and to the linear motion and position sensor, transforming the absolute GPS location of the material dispensing nozzle into a location in a coordinate system other than GPS using a coordinate transform processor, comparing the location of the material dispensing nozzle in the coordinate system other than GPS to a desired roadway mark path according to the coordinate system other than GPS, and moving the paint carriage laterally with respect to the vehicle based on the comparison between the location of the paint carriage in the coordinate system other than GPS to move a projection of the material dispensing nozzle to a desired roadway mark path according to the coordinate system other than GPS. The coordinate system other than GPS may be a Universal Transverse Mercator coordinate system or an East-North-Up coordinate system. The method may further include determining the geographical location of a second GPS antenna mounted on the vehicle and responsive to a second GPS receiver using a second signal processor responsive to the second GPS receiver; and determining the geographical location of a third GPS antenna mounted on the vehicle and responsive to a third GPS receiver using a third signal processor responsive to the third GPS receiver. The GPS location processor may be further responsive to the second signal processor and the third signal processor. The method may also further include transforming a desired GPS roadway mark path into the desired roadway mark path according to the coordinate system other than GPS using the coordinate transform processor. The paint carriage is moved by a control system including a hydraulic steering control unit, which may be electrically controlled. The method may further include the comparator producing an error signal based on the difference between the location of the material dispensing nozzle in the coordinate system other than GPS and the desired roadway mark path according to the coordinate system other than GPS. The control system may move the paint carriage laterally to reduce the error signal.

In another embodiment, a GPS-based control system is provided for positioning the projection of a material dispensing nozzle onto a predetermined roadway mark path located on a roadway surface. The control system includes a vehicle having an attached material dispensing nozzle which is laterally movable which respect to the vehicle, a GPS antenna mounted on the vehicle, a GPS receiver responsive to the GPS antenna, a signal processor responsive to the GPS receiver for determining the geographical location of the GPS antenna, a linear motion and position sensor for determining the relative lateral linear displacement of the material dispensing nozzle with respect to the vehicle, a GPS location processor responsive to the signal processor and to the linear motion and position sensor for determining the absolute GPS location of the material dispensing nozzle, a coordinate transform processor for transforming the absolute GPS location of the material dispensing nozzle into a location in a coordinate system other than GPS, a comparator for comparing the location of the material dispensing nozzle in the coordinate system other than GPS to a desired roadway mark path according to the coordinate system other than GPS; and a control system responsive to the comparator for controllably positioning the material dispensing nozzle projection onto the roadway mark path.

In another embodiment, a GPS-based control system is provided for positioning the projection of a material dispensing nozzle onto a predetermined roadway mark path located on a roadway surface. The control system includes a vehicle having an attached paint carriage which is laterally movable which respect to the vehicle, a material dispensing nozzle attached to the paint carriage, a GPS antenna mounted on the vehicle, a linear motion and position sensor for determining the relative lateral linear displacement of the material dispensing nozzle with respect to the vehicle, a GPS receiver responsive to the GPS antenna, a computer, and a control system. The computer is configured to determine the geographical location of the GPS antenna based on an output of the GPS receiver, determine the absolute GPS location of the material dispensing nozzle based on the geographical location of the GPS antenna and an output of the linear motion and position sensor, transform the absolute GPS location of the material dispensing nozzle into a location in a coordinate system other than GPS, and compare the location of the material dispensing nozzle in the coordinate system other than GPS to a desired roadway mark path according to the coordinate system other than GPS. The control system is configured to position the projection of the material dispensing nozzle onto the roadway mark path by moving the paint carriage based on the comparison of the location of the paint carriage in the coordinate system other than GPS to a desired roadway mark path according to the coordinate system other than GPS.

In another embodiment, a GPS-based control system is provided for positioning the projection of a material dispensing nozzle onto a predetermined roadway mark path located on a roadway surface. The control system includes a vehicle having an attached paint carriage which is laterally movable with respect to the vehicle, a material dispensing nozzle attached to the paint carriage, a GPS antenna mounted on the vehicle, a GPS receiver responsive to the GPS antenna, a signal processor responsive to the GPS receiver for determining the geographical location of the GPS antenna, a laser attached to the paint carriage for projecting a line pattern on the roadway surface, an imager configured to detect the projected line pattern, a GPS location processor responsive to the first signal processor and to the imager for determining the absolute GPS location of the material dispensing nozzle, a coordinate transform processor for transforming the absolute GPS location of the material dispensing nozzle into a location in a coordinate system other than GPS, a comparator for comparing the location of the material dispensing nozzle in the coordinate system other than GPS to a desired roadway mark path according to the coordinate system other than GPS, and a control system responsive to the comparator for controllably positioning the projection of the material dispensing nozzle onto the roadway mark path by laterally moving the paint carriage.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 3A is a perspective view of a paint carriage having a laser line generator mounted on the carriage frame and projecting a line onto a roadway surface and additionally showing the connection point of a linear motion and position sensor steel wire onto the carriage frame;

FIG. 3B is a side view of a paint carriage showing a laser line generator projecting a line onto a roadway surface in addition to a linear motion and position sensor mounted onto the frame of a vehicle;

FIG. 4A is a frontal view of an imaging system according to an embodiment of the present invention showing the imager affixed to a 3-axis rotational mount;

FIG. 10 is an expanded top view of an extended paint carriage and virtual roadway mark and roadway mark path showing visible indicia, having the paint and bead dispensing nozzles aligned with the virtual roadway mark and dispensing visible guide indicia;

DETAILED DESCRIPTION OF THE INVENTION

The present invention provides roadway marking systems used for replicating previous roadway traffic lane demarcation lines onto a newly repaved or constructed roadway surface. In some embodiments, the roadway marking systems have an improved GPS-based control system to accurately control the positioning of the roadway mark material dispensing nozzles over a predetermined roadway mark path.

Figure 1:
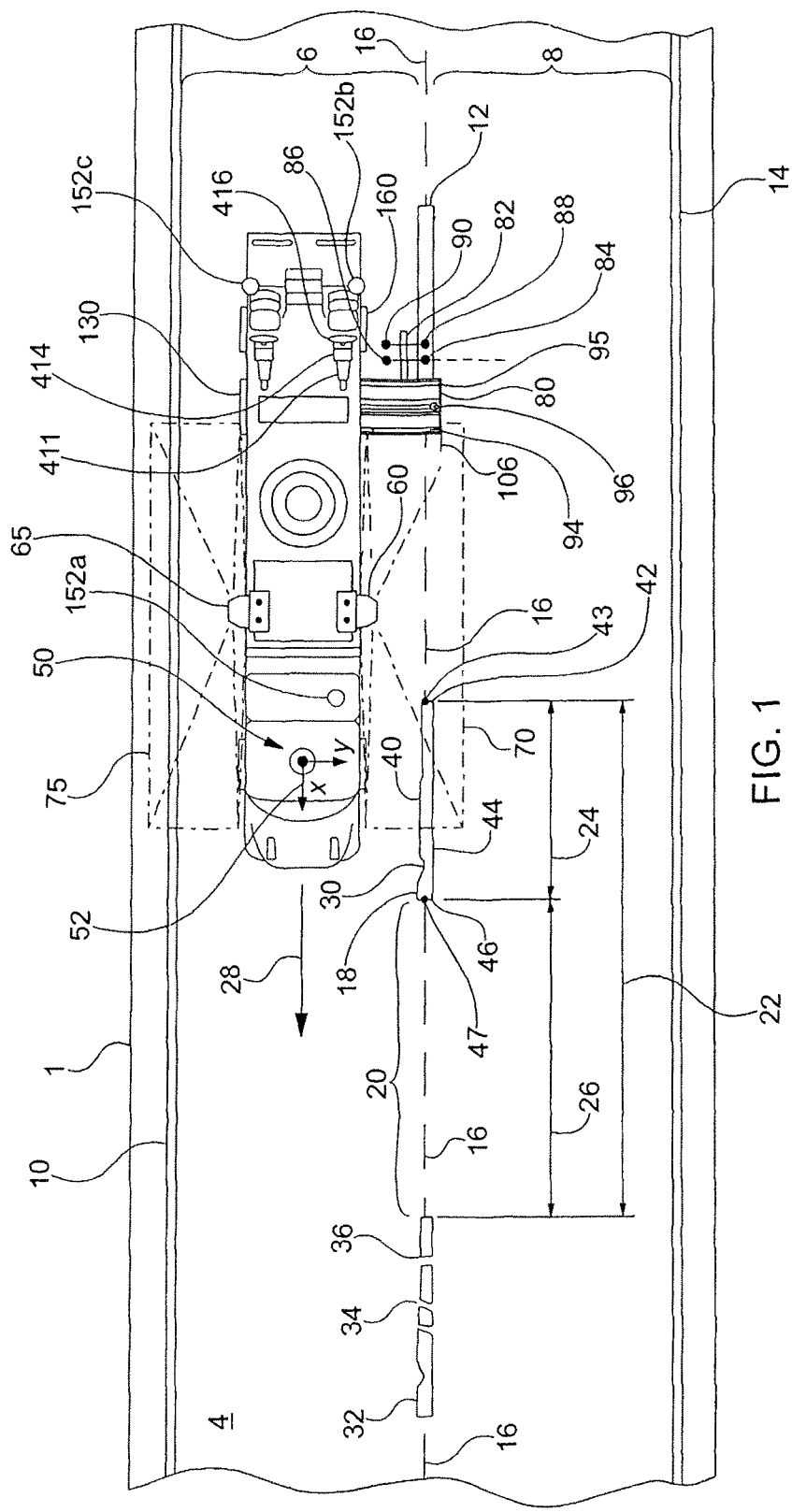
FIG. 1 is a diagrammatic plan view of a vehicle fitted with an apparatus according to an embodiment of the present invention and moving along a road having a center skip-line roadway mark pattern and roadway edge lines.

Referring now to the drawing, in which like reference numbers refer to like elements throughout the various figures that comprise the drawing, FIG. 1 shows a two lane roadway 1 having roadway surface 4 and conventional right and left traffic lanes 6 and 8 respectively, as commonly referred to in the United States. The right lane 6 is defined by continuous edge line 10 and a conventional center skip line 12. The left lane 8 is defined by a continuous edge line 14 and the center skip line 12. The traffic lanes 6 and 8 could have vehicle traffic flow in the same or opposite directions. It is further understood that the invention can be practiced on multi-lane roadways.

The center skip line 12 usually follows the longitudinal directed roadway mark path 16 shown as a dashed line on the roadway surface 4, and the edge lines 10 and 14 are usually offset a given distance in the lateral direction from the longitudinal directed roadway mark path 16, and therefore substantially parallel to the center skip line 12. It is understood that the longitudinal roadway mark path 16 is not visible on the roadway surface 4 but only illustrates and indicates the longitudinal center line of the roadway 1. A single roadway mark would usually be placed in close proximity to the roadway mark path (roadway center) and a double roadway mark would typically straddle the center line of the roadway.

Usually the roadway lane edge lines 10 and 14 are continuous lines, but may have breaks or otherwise segments which are not marked. Roadway traffic exit lanes are good examples of where the edge lines 10 and 14 may have breaks or may otherwise not be parallel with the longitudinal directed roadway mark path 16. Likewise, the center skip line 12 could be single solid line, or a double solid line, or a combination of these or other lines.

The center skip line 12 includes a cyclic pattern of roadway line mark segment 18 followed by an unmarked gap segment 20. This cycle of the roadway line mark segment 18 and the unmarked gap segment 20 is repeated continuously on roadway surface 4 along the roadway mark path 16, but may change depending upon the roadway mark specifications. For example, the center skip line pattern may change to a solid single or double line or even a roadway mark comprising one solid line mark parallel to a skip line, such as a conventional roadway passing mark. The invention is not limited to the particular type of center or edge line patterns, and includes solid single and double line patterns, skip-line (dashed) patterns, other patterns or various combinations of these and other line patterns.

The center skip line 12 has a cyclic length 22 with the roadway line mark segment 18 having a length 24 and gap segment 20 having a length 26. Skip line patterns may be noted as two numbers separated by a delimiter, the first number indicating the length 24 followed by the second number which indicates the length 22. For example, a 15/40 (the delimiter is the character '/') skip line pattern defines the length 24 of 15 feet and the length 22 of 40 feet, yielding a computed gap segment 20 length 26 of 25 feet. Many other skip line patterns exist and may include 10/40, etc.

A paint vehicle 50 having a right handed Cartesian coordinate system 52 is further shown moving in a forward longitudinal direction 28 within the right traffic lane 6 and along the roadway mark path 16, restriping existing roadway mark line segments of the center skip line 12. It is understood that the term "vehicle" is given its broadest meaning, including any conveyance, motorized device, or moving piece of mechanical equipment for transporting passengers or apparatus. More specific and preferred examples of vehicles are trucks and road marking machines.

As indicated in FIG. 1, the roadway line mark segment 18 has a partially worn away portion 30, while the following mark segment 32 has discontinuous breaks 34 and 36. Other mark segments may have a combination of worn away portions, breaks, or areas which have had their respective reflective elements removed from the surface of the roadway mark segment.

Restriping of the mark segments applies new roadway marking material substantially over each roadway mark segment and applies new roadway mark material (including reflective media (elements) if specified) especially over the worn away portion 30 of the mark segment 18 and the discontinuous breaks 34 and 36 of the following mark segment 32, thereby rehabilitating and maintaining the contrast visibility of the mark segments for a given skip line, or over an entire single or double line, or combination thereof, and is the subject of International Patent Application No. PCT/US2015/017034 incorporated herein by reference.

However, striping newly constructed or newly paved roadway surfaces requires a predetermined or defined roadway mark path to reestablish the previous roadway marks in their original position on the new roadway surface. For example, if the roadway 1 was repaved, the center skip line 12 as well as the continuous edge lines 10 and 14 would not be visible (i.e., removing the roadway surface 4 also removes the roadway marks). If the GPS position of the roadway mark path 16 was previously determined, however, the center line of roadway 1 and its GPS position would be known and, knowing further the edge line offsets from the center line, the GPS positions of the continuous edge lines 10 and 14 could also be determined.

Roadway mark segments are usually characterized by rectangular shaped marks defined by near and far longitudinal edge lines, and beginning and ending lateral edge lines. For example, the roadway line mark segment 18 is substantially rectangular having a near longitudinal edge line 40 (i.e., the longitudinal edge line closest to the vehicle 50) and a far longitudinal edge line 44 (i.e., the longitudinal edge line farthest from the vehicle 50), and a beginning lateral edge line 42 (i.e., the first lateral edge line approached by the vehicle 50) and an ending lateral edge line 46 (i.e., the second lateral edge line approached by vehicle 50). The edge lines 40, 42, 44 and 46 form a rectangular shaped boundary of the roadway mark line segment 18. The lateral edge lines 42 and 46 define the beginning and ending lines, respectively, of the roadway mark line segment 18, and points 43 and 47 define the center points of the lateral edge lines 42 and 46, respectively, and are substantially located on the roadway mark path 16 (for a single line roadway mark).

Further shown in FIG. 1 are downwardly focused and enclosed imaging systems 60 and 65 mounted on the driver and passenger sides of the vehicle 50 respectively. The imaging system 60 is positioned on vehicle 50 to image area 70, and the imaging system 65 is positioned to image a similar area 75 on the passenger side of the vehicle 50. The enclosed imaging systems 60 and 65 are identical and are more fully disclosed below with reference to FIGS. 4A and 4B.

Figure 2:
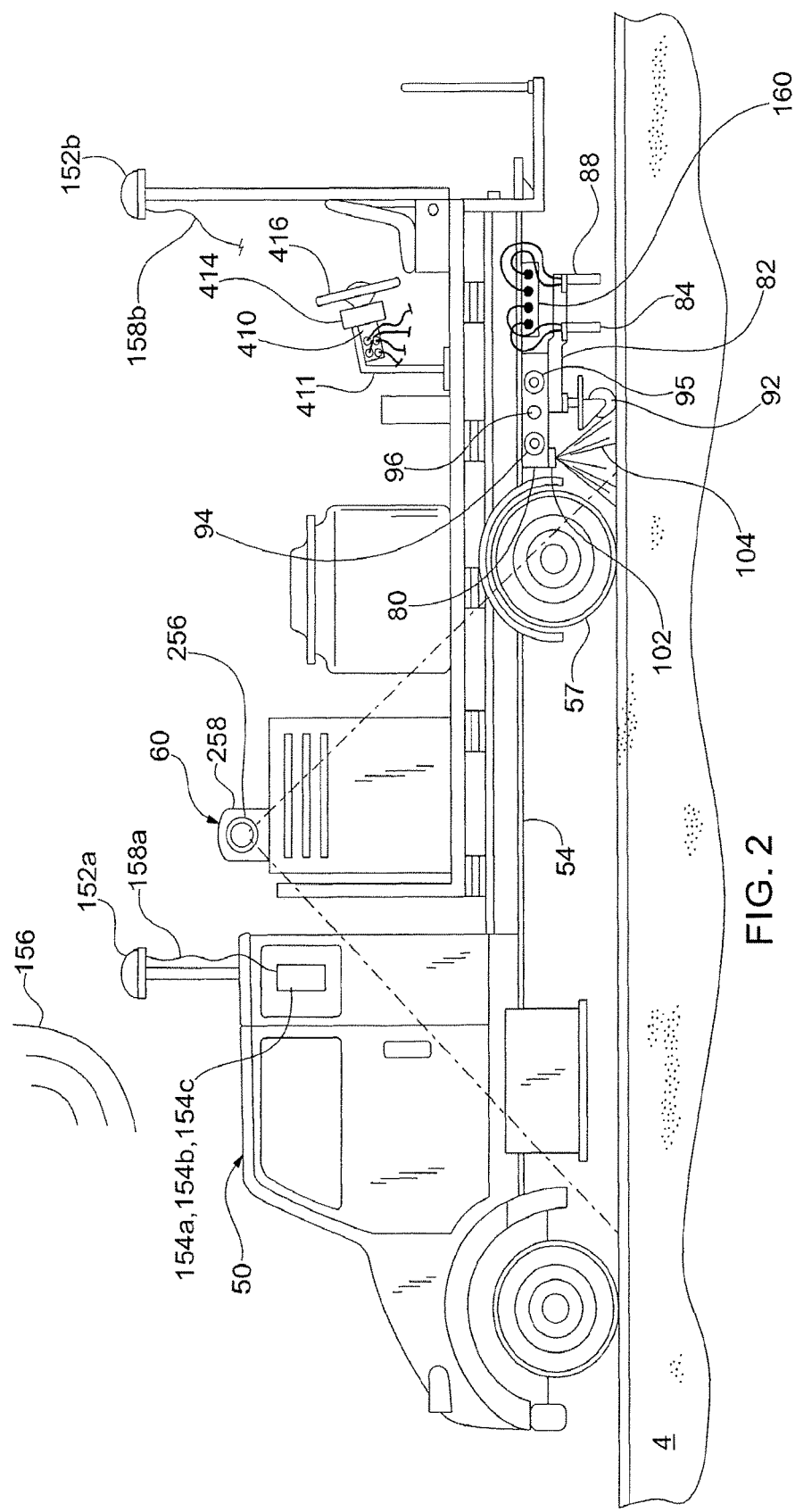
FIG. 2 is a diagrammatic side view of a vehicle fitted with an apparatus according to an embodiment of the present invention, illustrating additional components of the apparatus.

Referring additionally to FIG. 2, the driver's side of the vehicle 50 has an attached and laterally moveable paint carriage 80, shown in an extended position away from the vehicle 50 and positioned over the center skip line 12 (shown in FIG. 1). A paint and bead nozzle support member 82 is moveably affixed to the paint carriage 80 and supports one or more material dispensing nozzles, such as outward positioned paint nozzle 84 and inward positioned paint nozzle 86 and their respective outward and inward positioned reflective bead nozzles 88 and 90. A vertical load bearing rotatable wheel 92 is attached to paint and bead nozzle support member 82 and is in contact with the roadway surface 4. The wheel 92 vertically supports the paint and bead nozzle support member 82 when the paint carriage 80 is in an extended position away from the vehicle 50.

The lateral distance between the paint nozzles 84 and 86 may be manually adjusted to accommodate the restriping of parallel double lines (for example, a solid line parallel to a skip line, usually used to designate an allowed passing zone, or two solid lines, usually used to designate a no passing zone, etc.). In a similar fashion the lateral distance between the reflective bead nozzles 88 and 90 can be manually adjusted to allow lateral alignment with the paint nozzles 84 and 86, respectively, for dispensing reflective beads on top of the newly dispensed paint.

Referring now additionally to FIGS. 3A and 3B, further attached to the paint carriage 80 are laterally extendable cylindrically shaped support arms 94 and 95. A hydraulic cylinder 412 having a piston 440 connected to a piston rod 447 (hydraulic cylinder 412 and piston 440 are shown with respect to FIG. 5) is attached to the frame 54 of vehicle 50 and is positioned between support arms 94 and 95. The distal end of the piston rod 447 is attached to the extendable end of paint carriage 80 at an attachment point 96. Hydraulically powering piston 440 provides the necessary force to laterally extend or retract carriage piston rod 447 (and therefore laterally extend or retract paint carriage 80) from or toward paint vehicle 50, thereby controlling the lateral positioning of paint nozzles 84 and 86 and respective bead nozzles 88 and 90 and their respective vertical projections over a desired roadway mark position.

Further shown in FIGS. 3A and 3B is a laser line generator 102 mounted underneath the frame of the paint carriage 80 (which includes front, side and rear frame members 116, 118 and 120, respectively) having a fanned pattern of laser light 104 downwardly focused onto, and intersecting with, the roadway surface 4 thereby producing a line pattern 106. The fanned pattern of laser light 104 is further characterized by a fan angle 108. The line generator 102 may also include infrared and ultra-violet lasers, or any other focusable electromagnetic radiation sources. The line pattern 106 is positioned such that it is within the driver side area 70 and may be imaged by driver side imaging system 60. The driver side imaging system 60 may then determine the lateral position of the paint carriage 80 (imaging system 60 has been previously corrected for lens and perspective distortion and is GPS calibrated). The driver side imaging system 60 is electromagnetically responsive to the laser line generator 102.

Thus, as the paint carriage 80 moves in a lateral direction inward and outward from the vehicle 50, the line pattern 106 also moves giving a visual indication (for a visible laser line generator) of the lateral position on the paint carriage 80. The lateral positions of the paint nozzles 84 and 86 and the reflective bead nozzles 88 and 90 (and their respective projections onto roadway surface 4) are therefore also visually indicated by the line pattern 106 taking into consideration any fixed offsets between the paint nozzles 84 and 86 and the reflective bead nozzles 88 and 90 and the line pattern 106. The laser generator 102 may also be moved laterally along the frame of the paint carriage 80 and positioned so that line pattern 106 is laterally aligned with one of the paint nozzles 84 and 86, for example the paint nozzle 84.

The laser line generator 102 may also be mounted to the frame 54 projecting the fanned pattern of laser light 104 first horizontally with respect to the roadway surface 4 and then being subsequently reflected downward by a mirror mounted on the paint carriage 80 again forming line pattern 106 with the roadway surface 4. The paint carriage 80 may further have reflective ruler markings 115 placed onto a front frame member 116 of the paint carriage 80, which may be imaged by the imaging system 60 and which then may also indicate the lateral position of the paint carriage 80. The lateral positions of the paint nozzles 84 and 86 and the bead nozzles 88 and 90 and their projections onto the roadway surface 4 may then be determined.

The laser line generator 102 may also include a laser pointer projecting a substantially circular 'spot' pattern onto the roadway surface 4 and within the driver side area 70 and may also be used to determine the lateral positions of the paint nozzles 84 and 86 and the reflective bead nozzles 88 and 90 and their projections onto the roadway surface 4 (offset corrected). Additionally, the laser line generator 102 may also include a cross hair producing optic which projects two perpendicular lines onto the roadway surface 4. The intersection of these lines produces a dot onto the roadway surface 4 within the driver side area 70.

Also, alternately attached to the frame 54 is a linear motion and position sensor 110 having a flexible extendable steel cable 112 positioned between the cylindrically shaped support arms 94 and 95 and attached to the distal end of the paint carriage 80 at attachment point 114. The linear motion and position sensor 110 may also determine the relative lateral movement of the paint carriage 80, and therefore the lateral position of the paint nozzles 84 and 86 and reflective bead nozzles 88 and 90, taking again into consideration any fixed offsets between the paint nozzles 84 and 86 and the reflective bead nozzles 88 and 90 and the attachment point 114 between the extendable end of the extendable steel wire 112 and the side frame member 118 of the paint carriage 80. The GPS position of the paint carriage 80 and therefore the paint nozzles 84 and 86 and the reflective bead nozzles 88 and 90 can be determined from conventional calibration techniques. The GPS position of the extendable steel cable 112 is also known from conventional calibration techniques (offset corrected). Further, the GPS location of the nozzles projection onto the roadway surface 4 is known from conventional calibration techniques (offset corrected).

A laterally moveable paint carriage 130 identical to the paint carriage 80 is attached to the passenger side of the vehicle 50 and is shown in a slightly extended position beyond the passenger's side of vehicle 50 in FIG. 1. The paint carriage 130 is located on the opposite side of the vehicle 50 and is identical to the paint carriage 80.

The driver side imaged area 70 includes the center skip line 12 (or any other center line which may include single or double solid, or combination of a skip and a solid line, or any combination thereof) with the vehicle 50 travelling anywhere within the right traffic lane 6. The passenger side area 75 includes the continuous edge line 10 with vehicle 50 travelling anywhere within right traffic lane 6. Both imaged areas 70 and 75 laterally extend past the full lateral extension of their respective paint carriages 80 and 130, and also image their respective line pattern 106 or the spot and carriage ruler markings.

For striping newly constructed or repaved or resurfaced roadway surfaces, the imaged areas 70 and 75 will only include their respective portions of the roadway surface 4 and laser lines or laser spot images and carriage ruler markings, which can be used to determine the absolute GPS location of the carriage as discussed below (offset corrected).

Further attached to the paint vehicle 50 is a real time kinematic (RTK) enabled global positioning system (GPS) including one or more GPS antennas 152, for example GPS antennas 152a, 152b and 152c, externally mounted onto the vehicle 50, and one or more GPS receiver modules 154, for example GPS receiver modules 154a, 154b, and 154c, internally mounted within the cab of the vehicle 50. GPS receiver modules 154 may include model BX982 manufactured by Trimble Navigation Limited of Sunnyvale, Calif. Other embodiments may include one, two, three, or more than three GPS antennas and corresponding receivers.

The GPS antennas 152a, 152b and 152c all receive satellite GPS signals 156. Each GPS antenna 152 is in communication with one of the GPS receivers 154. For example, a communication cable 158a electrically connects the antenna 152a to the receiver 154a. Similarly, the cables 158b and 158c (not shown in FIG. 2) connect the GPS antennas 152b and 152c to the receivers 154b and 154c, respectively. The GPS antennas 152a, 152b and 152c are in electrical communication with the receivers 154a, 154b and 154c, respectively.

The GPS antenna 152a is mounted on the forward driver's side of the vehicle 50, the antenna 152b is longitudinally aligned with the antenna 152a and is mounted on the rearward driver's side of the vehicle 50, and the antenna 152c is mounted on the rearward passenger's side of the vehicle 50 and the laterally opposite antenna 152b.

The GPS antennas 152a, 152b and 152c may form a vehicle Cartesian coordinate system which may include the Cartesian coordinate system 52 (accounting for offsets), or other vehicle based coordinate systems (Cartesian or other coordinate systems) having different origins (again accounting for offsets). Other vehicle mounted GPS systems may be used to construct a local vehicle coordinate system, such as inertial navigation systems (INS) having one or more GPS antennas and corresponding receivers. One such system, for example, is the Spatial Dual INS manufactured by Advanced Navigation of New South Wales, Australia, having two GPS antennas and cooperating GPS receivers.

Figure 4B:
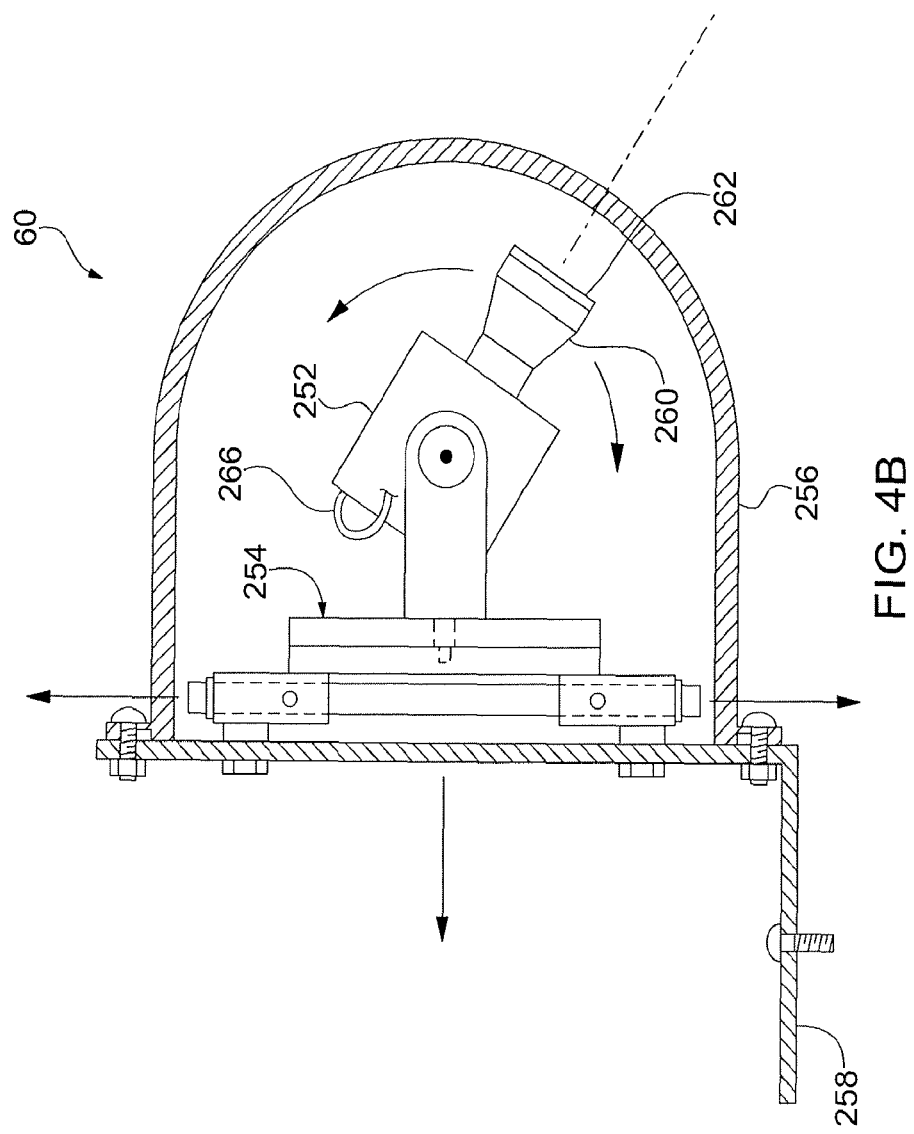
FIG. 4B is a side view of the imaging system of FIG. 4A specifically illustrating a protective semi-hemispherical protective globe and mounting bracket.

Referring now additionally to FIG. 4A and FIG. 4B, driver side imaging system 60 includes a GPS calibrated imager 252, a 3-axis adjustable mount 254, a protective globe 256 and a mounting angle bracket 258. The protective globe 256 may be made of a translucent or transparent material, for example Plexiglas. The GPS calibrated imager 252 may be a progressive scan charge coupled device (CCD) camera having a CCD sensor having a rectangular shaped pixel array usually arranged in a rectangular format for converting light into electrical signals, such as model number RM/TM-6740CL manufactured by JAI Inc. of San Jose, Calif. (United States office). For example, the CCD sensor for the RM/TM-6740CL has an array of 640×480 active pixels. Many other imagers capable of converting light into electrical signals are available in the market.

Attached to the GPS calibrated imager 252 is a lens 260 which may have an optical filter 262 and further have a manually or electronically adjustable aperture. The GPS calibrated imager 252 additionally has programmable electronic shutter 263 (referenced in FIG. 7) which controllably determines the amount of light received by the CCD sensor. The driver side imaging system 60 has been more fully described in International Patent Application No. PCT/US2015/017034, referred to above. Again, passenger side imaging system 65 is identical to driver side imaging system 60.

Figure 5:
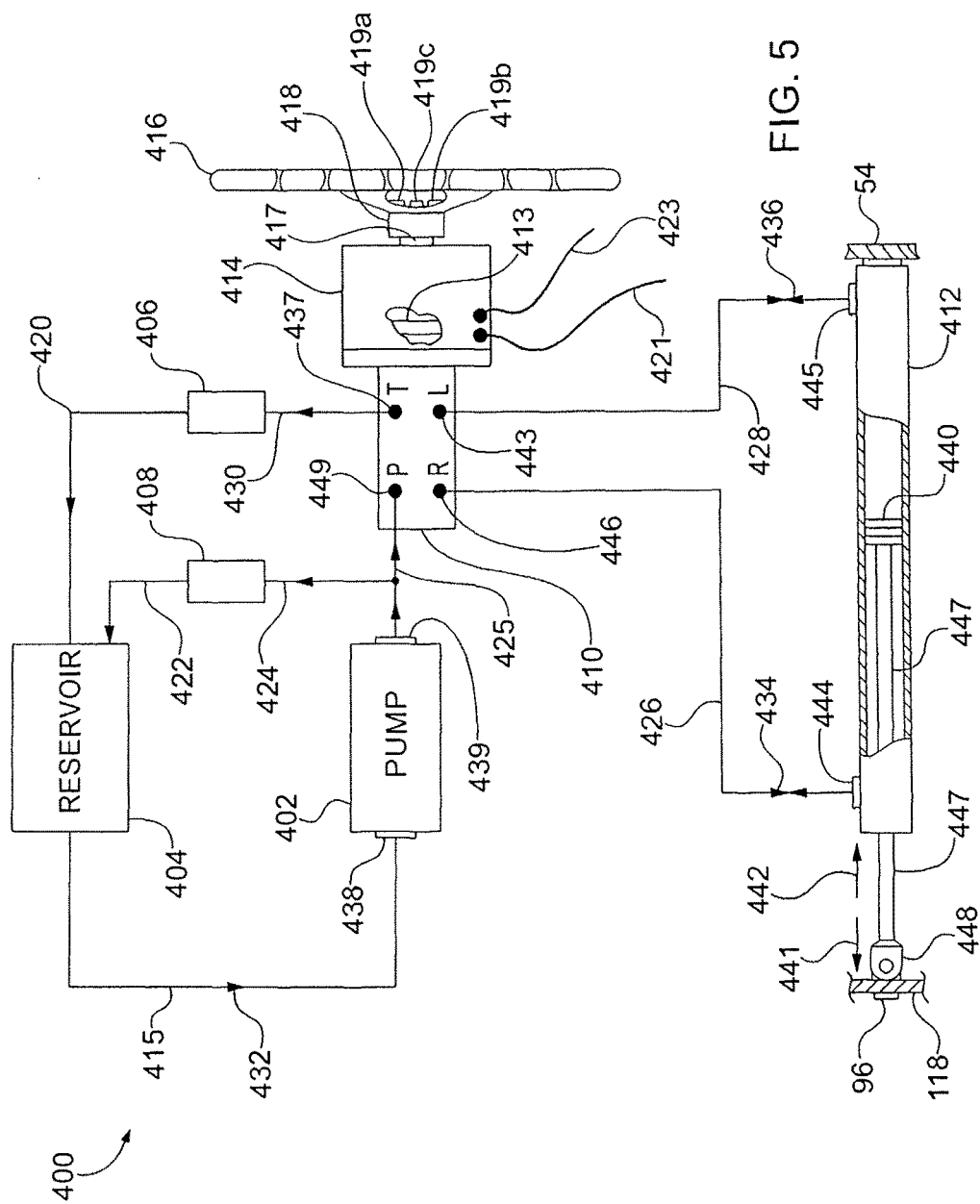
FIG. 5 is a schematic diagram of a manually operable paint carriage hydraulic control system enhanced with an electric motor and controller for controlling the lateral movement of the paint carriage.

Referring now additionally to FIG. 5, a hydraulic steering system 400 for controlling the lateral movement of the paint carriage 80 is shown and includes a hydraulic pump 402, a hydraulic fluid reservoir 404, a hydraulic fluid filter 406, a pressure relief valve 408, a hydraulic steering control unit 410, the hydraulic cylinder 412 and a steering wheel 416. An electric motor 414 is also shown. The hydraulic pump 402, the reservoir 404, the filter 406, the relief valve 408, the steering control unit 410, and the hydraulic cylinder 412 are in fluid communication with each other via conduits 415, 420, 422, 424, 425, 426, 428, and 430. One direction hydraulic fluid flow is indicated by single headed arrows (for example, single headed arrow 432) while doubly connected headed arrows indicate possible hydraulic flow in both directions (for example, doubly connected headed arrows 434 and 436). A manufacturer of hydraulic steering control units is Eaton Corporation of Beachwood, Ohio.

A splined shaft (not shown) of the hydraulic steering control unit 410 is axially aligned with and is attached to a shaft 417 of the electric motor 414 via a connecting hub 418. The steering wheel 416 is axially aligned with and is also attached to the shaft 417 of the electric motor 414 via the connecting hub 418 and bolts 419a, 419b and 419c. Internal to the electric motor 414 is programmable motor controller 413 which externally communicates via a local bus 421 with the computer 702 (shown in FIG. 7), and may be programmed by computer 702 via signals sent onto the local bus 421 to control the rotational position, velocity, or torque of the shaft 417 of the electric motor 414, and therefore the splined shaft of the hydraulic steering control unit 410. Electrical power is supplied to the electric motor 414 via a power cable 423, and may be derived from a 12 volt battery of the vehicle 50, or other suitable power source. The electric motor 414 may be a direct drive permanent magnet synchronous motor (PMSM), having high torque and low operational rotational velocity, or other type of electric motor. The electric motor 414 is further adapted to be easily installed and retrofitted onto the hydraulic steering control unit 410 without requiring special modifications to either the steering wheel 416, the steering control unit 410 or the support stand 411 (the support stand 411 is shown in FIGS. 1 and 2).

The hydraulic fluid reservoir 404 connects to an inlet port 438 of the hydraulic pump 402 via the conduit 415. An outlet port 439 of the hydraulic pump 402 connects to a pressure (P) port 449 of the steering control unit 410 and the input port of the relief valve 408 via the conduit 424. The output port of relief valve 408 connects to reservoir 404 via the conduit 422. The tank (T) port 437 of the hydraulic steering control unit 410 connects to an inlet port of the hydraulic fluid filter 406 via the conduit 430. The output port of the hydraulic fluid filter 406 connects to the reservoir 404 via the conduit 420. A right port (R) 446 of hydraulic steering unit 410 connects to a port 444 of hydraulic cylinder 412 via the conduit 426, and a left port (L) 443 of hydraulic steering unit 410 connects to a port 445 of the hydraulic cylinder 412 via conduit 428.

The hydraulic cylinder 412 has the piston 440 having the connected piston rod 447 which extends and retracts in directions 441 and 442, respectively, in response to hydraulic fluid flow in conduits 426 and 428. The proximal end of the piston rod 447 connects to the piston 440 and the distal end of the piston rod 447 attaches to the inside of side frame member 118 of the paint carriage 80 at the attachment point 96 using a clevis fastener 448. Thus, the connected piston rod 447 when extending laterally extends the paint carriage 80, and when retracting laterally retracts the paint carriage 80 (with respect to frame 54).

A clockwise rotation of the splined shaft of the hydraulic steering control unit 410 either produced automatically by the electric motor 414 (and therefore under the command of the computer 702) or manually with the steering wheel 416, causes a pressure differential between the surface areas of the piston 440. This pressure differential forces the piston 440, and therefore the connected piston rod 447, to move into hydraulic cylinder 412 in direction 442, thereby laterally retracting the paint carriage 80 into the driver's side of vehicle 50.

A counter clockwise rotation of the splined shaft of the hydraulic steering control unit 410, either produced automatically by the electric motor 414 (again under the control of the computer 702) or manually with the steering wheel 416, causes a pressure differential between the surface areas of the piston 440. This pressure differential forces the piston 440, and therefore the connected piston rod 447, to extend outwardly from the hydraulic cylinder 412 in direction 441, thereby laterally extending the paint carriage 80 outwardly from the driver's side of vehicle 50.

It is therefore understood that the computer 702 may communicate with the electric motor 414 via commands sent to the programmable controller 413 via the local bus 421, and therefore may control the lateral position of the paint carriage 80 and therefore the lateral locations of the paint nozzles 84 and 86 and the reflective bead nozzles 88 and 90 along with their respective vertical projections onto roadway surface 4. Electrically disengaging the electric motor 414 (defined as allowing the free rotation of the shaft 417 of the electric motor 414) by the computer 702 allows the spline shaft of the hydraulic steering control unit 410 to be manually rotated via the steering wheel 416 without any interference or assistance from the electric motor 414. With the electric motor 414 disengaged, the lateral position of the paint carriage 80 may be manually controlled as if the electric motor 414 had not been inserted into the hydraulic system. The advantage of this arrangement is that when the electric motor 414 is completely disengaged the hydraulic steering system 400 and therefore the paint carriage 80 can be manually positioned as if the electric motor 414 was not present.

A hydraulic steering system controls the lateral movement of the paint carriage 130. The hydraulic steering system is identical in every respect to hydraulic steering system 400 except that the hydraulic connections are reversed on the hydraulic cylinder so that a counter clockwise rotation of the steering wheel (or motor) retracts, and a clockwise rotation of the steering wheel (or motor), extends the paint carriage 130. Other hydraulic systems and carriage propulsion system configurations are possible (for example, an all electrically powered configuration) for controlling the movement of the paint carriages 80 and 130.

Figure 6:
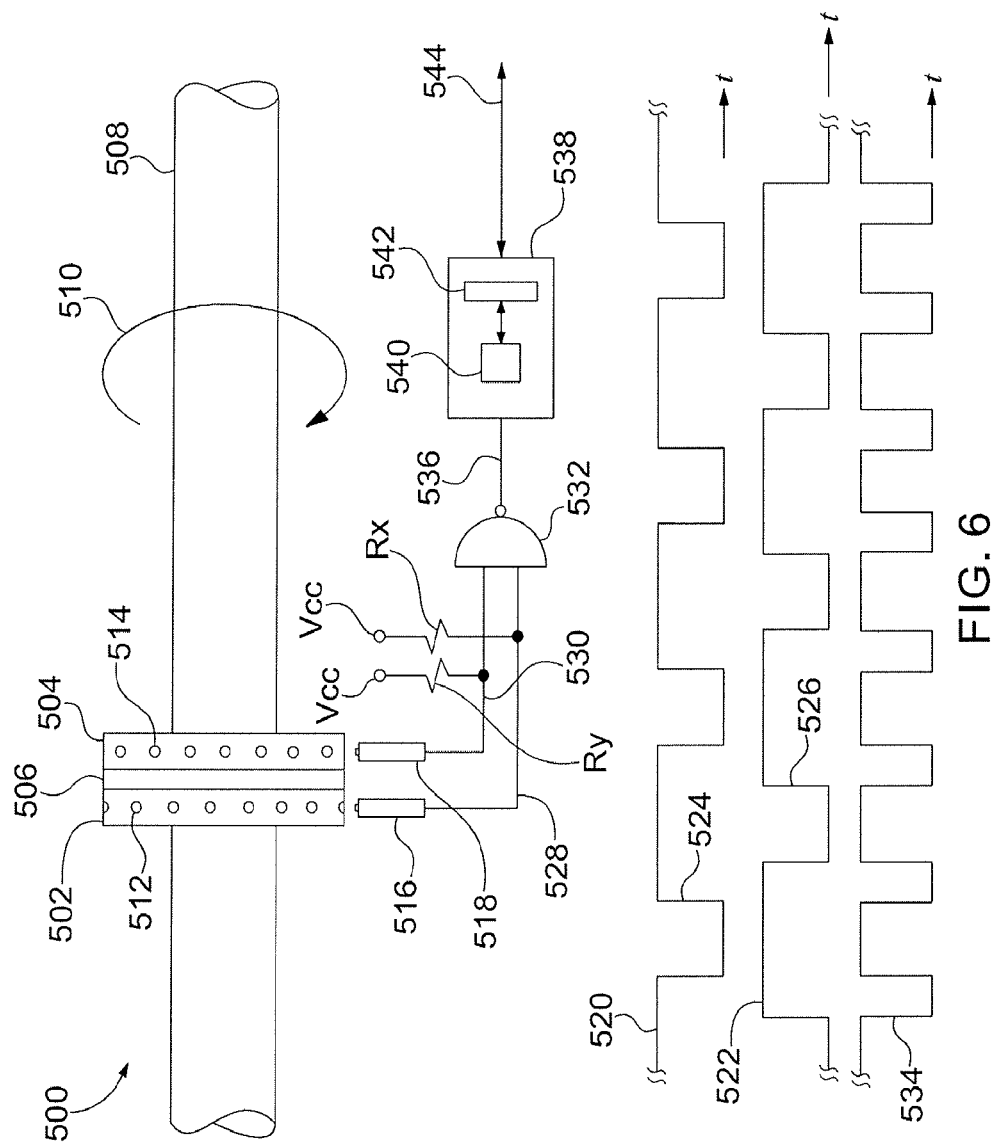
FIG. 6 is a schematic diagram of a drive shaft positional sensor for a vehicle.

Referring additionally to FIG. 6, a drive shaft positional sensor 500 is shown and includes non-magnetic split shaft collars 502 and 504 separated from one another by non-magnetic split spacer 506. The halves of the shaft collars 502 and 504 along with the split spacer 506 are clamped around a drive shaft 508 of vehicle 50 with recessed screws (not shown) or other fastening elements.

The drive shaft 508 is further connected to a rear axle differential which in turn drives a rear axle of the vehicle 50. Further attached to the rear axle are a driver side rear wheel 57 (referenced in FIG. 2) and a passenger side rear wheel. The drive shaft 508 rotates the rear axle and hence rotates the rear wheel 57 of the vehicle 50. A rotation (or part thereof) of the drive shaft 508 therefore corresponds to the longitudinal distance travelled by the vehicle 50 via rotation of the rear wheel 57.

As the drive shaft 508 rotates in direction 510, the split collars 502 and 504 along with the split spacer 506 also rotate in the same direction 510. Pluralities of cylindrically shaped permanent magnets 512 and 514 are imbedded and potted within, and are radially arrayed around the outer circumference of, the split shaft collars 502 and 504, respectively. Further, split shaft collar 504 is radially displaced from split shaft collar 502 so the magnets 514 are radially aligned between the magnets 512. A manufacturer of these types of magnetic shaft collars includes Electro-Sensors, Inc. of Minnetonka, Minn. 55343.

Hall-Effect sensors 516 and 518 are positioned in close proximity to the outer circumference of the split shaft collars 502 and 504, respectively, and are attached to the frame 54 of the vehicle 50. The Hall-Effect sensors 516 and 518 cooperate and detect the changing magnetic flux produced by the plurality of magnets 512 and 514, respectively, as collars 502 and 504 rotate in response to the rotation of the drive shaft 508 in direction 510.

In response to the changing magnet flux, the Hall-Effect sensors 516 and 518 produce active low signals 520 and 522 (represented by pulses 524 and 526, respectively) onto lines 528 and 530, respectively, which then flow into the inputs of the NAND gate 532. The output of each of Hall-Effect sensors 516 and 518 are connected to external pull-up resistors Rx and Ry, respectively. The pull-up resistors Rx and Ry may also be internal to the Hall-Effect sensors 516 and 518. The other ends of the pull-up resistors Rx and Ry are connected to DC voltage Vcc, which may be the +12 volt battery of the vehicle 50, or other suitable power source.

NAND gate 532, in response to input of the active low signals 520 and 522, produces active high signal 534. The output active high signal 534 from the NAND gate 532 flows onto line 536 and is an input signal to bus interface circuit 538. The NAND gate 532 is shown separately for clarity but may be directly incorporated into interface circuit 538. NAND gate 532 may be a SN74HC00 integrated circuit manufactured by Texas Instruments of Dallas, Tex., United States.

The active high signal 534 is composed of the active low signals 520 and 522 from the split shaft collars 502 and 504. Having the split shaft collar 504 radially displaced from split shaft collar 502 allows twice as many magnetic pulses than that possible from just one collar given a particular shaft collar size and number of magnets per collar. Having the additional split shaft collar 504 increases the angular resolution of the drive shaft 508 rotation per pulse. More collars radially displaced from one another may be added to increase the angular resolution of the drive shaft 508.

For example, if split shaft collar 502 has a total of thirty-six magnets then each active low pulse 524 corresponds to an angular rotation resolution of 10 degrees. With the split shaft collar 504 also having thirty-six magnets and radially displaced so that the magnets 514 are radially between magnets 512 of collar 502, the second non-interfering active low pulse 526 is produced between the pulses 524, in effect giving an angular rotation resolution of 5 degrees. Therefore each pulse of the signal 534 corresponds to a known angular rotation of the drive shaft 508 and therefore a known angular rotation of the rear wheel 57.

The longitudinal distance travelled (or the longitudinal distance that will be travelled) by the vehicle 50 is then easily determined by counting the number of active high pulses of the active high signal 534 and multiplying this number by the distance travelled per pulse of the active high signal 534. Distance travelled per pulse is determined by having vehicle 50 transverse a known distance and counting the number of pulses received for that distance. The distance travelled may be determined by using GPS derived coordinates or a speed detector in cooperation with a time base (described later), or as has usually been done in the past, manually measuring a fixed distance and counting the pulses generated over the fixed distance. The speed of the vehicle 50 may also be determined by calculating the distance travelled divided by the corresponding time interval.

The bus interface circuit 538 may incorporate a microprocessor 540 in bi-directional communication with a bus interface circuitry 542, and may further incorporate the NAND gate 532. The bus interface circuitry 542 handles all bi-directional communication to and from local bus 544 to the microprocessor 540. The microprocessor 540 may input active high signal 534 from line 536 and be programmed by the computer 702 to perform computational tasks such as counting a certain number of pulses of signal 534 over a particular time interval via a conventional gating signal. For example, the computer 702 may communicate to the bus interface circuit 538 a "start count" command which would instruct circuit 538 to begin counting the active high pulses of signal 534, and then communicate to interface circuit 538 a "stop count" command which would instruct circuit 538 to end counting the pulses of signal 534. The computer 702 may then request the total pulse count of the active high signal 534 which occurred between the "start count" and "stop count" commands from the bus interface circuit 538, whereby the bus interface circuit 538 would send the total pulse count back to the computer 702 via the local bus 544.

The total pulse count may then be combined with GPS derived distance to obtain a distance travelled per pulse ratio.

Bus interface circuitry 542 conditions the microprocessor 540 signals intended to be sent onto the local bus 544 to be compatible with the chosen local bus 544 specification, and conditions signals received from the local bus 544 intended to be sent to the microprocessor 540 to be compatible with the signal specifications of the microprocessor 540. Bus 544 may be compatible with, for example, CANopen or EIA-485 (formally referred to as RS-485) communication protocol specifications, or other protocol specifications. Thus, the bus interface circuitry 542 is in bi-directional communication with the computer 702 (and other components shown in FIG. 7) via local bus 544. The bus interface circuit 538 can be programmed by the computer 702 to perform certain computational tasks and further communicates the results of these tasks back to the computer 702 via the local bus 544.

Other mechanisms of generating the total number of pulses per longitudinal distance travelled by the vehicle 50 may be used in place of the drive shaft positional sensor 500. For example, it is well known that other mechanisms may already be incorporated into a vehicle for providing for pulses (which are subsequently counted) and calibrated against distance travelled to give a distance per pulse ratio. Some braking systems and other mechanisms (for example, an on-board vehicle computer) could provide the active high signal 534.

Figure 7:
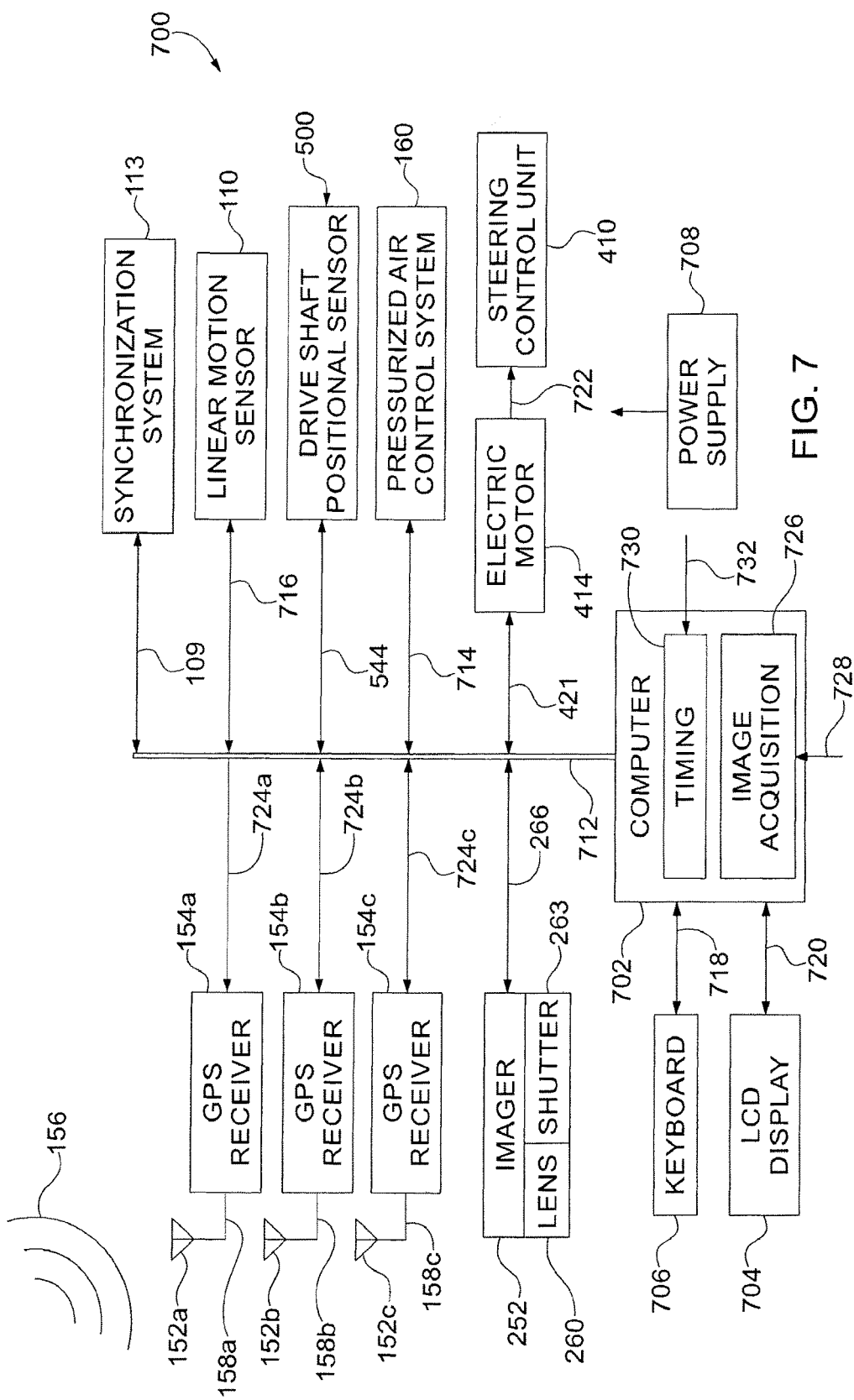
FIG. 7 is a schematic block diagram of a control system according to an embodiment of the present invention for replicating roadway marks or placing guide indicia onto a roadway surface.

Referring now additionally to FIG. 7, a GPS-based control system 700 for paint carriage 80 is shown and includes the computer 702, a display 704 (e.g., LCD display), a keyboard 706, the GPS calibrated imager 252, the GPS receiver modules 154a, 154b and 154c having cooperating GPS antennas 152a, 152b and 152c, respectively, a pressurized air control system 160, the electric motor 414, the hydraulic steering control unit 410, the linear motion and position sensor 110, the drive shaft positional sensor 500, the synchronization system 113 and a power supply 708.

The computer 702 is in bi-directional communication (i.e., sends and receives data) among the components shown in FIG. 7 which include individual GPS receiver modules 154a, 154b and 154c, imager 252, the pressurized air control system 160, the electric motor 414, the drive shaft positional sensor 500, the synchronization system 113 and the linear motion and position sensor 110 via master bus 712 and local busses 724 (comprising local busses 724a, 724b and 724c, singularly or collectively referred to as 724), and local busses 266, 714, 421, 544, 109 and 716, respectively. Each component is in bi-directional communication with each other. Pressurized air control system 160 is more fully disclosed in International Patent Application No. PCT/US2015/017034, referred to above.

The master bus 712 may be composed of a number of different individual local busses, each individual local bus having different electrical and mechanical specifications supporting their respective communication protocols. For example, local bus 266 may be a camera link compatible bus and local bus 421 may be a CANopen compatible bus, and when grouped or bundled together form part of master bus 712.

The keyboard 706 and the display 704 are conventional computer peripherals and are connected to the computer 702 via bidirectional universal serial buses (USB) 718 and 720, respectively. The keyboard 706 allows an operator to enter alpha-numeric and other data into the computer 702, and the display 704 displays information from the computer 702 for viewing by the operator. The display 704 may also be a "touch" display allowing the operator to both view information and enter data by selectively touching areas displayed on the display 704, similar to the displays used on "smart" cell phones such as the Apple iPhone 5. Additionally, a computer compatable mouse and joystick are also provided (not shown) for entering data into the computer 702 by the operator.

The power supply 708 supplies electrical power to all powered components and includes the synchronization system 113, the computer 702, the GPS calibrated imager 252, the GPS receiver modules 154a, 154b and 154c, the linear motion and position sensor 110 and the drive shaft positional sensor 500, and may use the 12 volt battery of vehicle 50 as its primary power source. The pressurized air control system 160 and the electric motor 414 may be powered directly from the 12 volt battery of the vehicle 50 or may be alternately powered by the power supply 708. The GPS antennas 152a, 152b and 152c may be powered from their respective receiver modules which is usually the case, or may be powered from the power supply 708.

Also shown in FIG. 7 is the hydraulic steering control unit 410 of FIG. 5 which responds to both the rotation of the steering wheel 416 and more specifically to the controlled rotation of the shaft rotation of the electric motor 414, which is represented by arrow 722.

The GPS antennas 152a, 152b and 152c (singularly or collectively referred to as antenna array 152) are electrically in communication with the GPS receiver modules 154a, 154b, and 154c (singularly or collectively referred to as GPS receiver modules 154) via the communication cables 158a, 158b and 158c, respectively. Communication cables 158a, 158b and 158c are singularly or collectively referred to as communication cables 158.

The GPS antennas 152a, 152b and 152c and GPS receiver modules 154a, 154b, and 154c are adapted to receive the satellite GPS signals 156 from any GPS satellite system (for example, the Russian's GLONOSS system or the United States' Global Positioning System), or from a GPS-pseudolite system. Additionally, the GPS receiver modules 154a, 154b, and 154c are further adapted to receive real time kinematics (RTK) data via a separate communication channel (not shown) to compliment the satellite derived GPS data thereby increasing the GPS determined positional accuracy of the vehicle 50.

The GPS receiver modules 154a, 154b, and 154c decode signals received by the GPS antennas 152a, 152b and 152c and use RTK data (via the separate communication channel) and determine the geographical location (longitudinal, latitude and altitude (LLA data) or Earth Centered Earth Fixed (ECEF data)) of the GPS antennas 152a, 154b and 154c. Positional offsets from the GPS determined locations of the GPS antennas 152a, 154b and 154c to any relative location on vehicle 50 may then be determined taking into consideration any offsets from the relative locations to the GPS antennas 152a, 152b and 152c, including the origin of vehicle Cartesian coordinate system 52. The relative location could include the locations of both fixed and moveable objects (such as the paint carriages 80 and 130) on the vehicle 50 itself, or of any objects imaged from vehicle 50 using images generated from the imaging systems 60 or 65, or the location of the paint and bead nozzles and their respective projections onto the roadway surface 4. Using the GPS locations of the GPS antennas, the absolute GPS location of any object (stationary or moving) attached to the vehicle 50 can also be determined (offset adjusted).

Bi-directional communication with the GPS receiver modules 154a, 154b and 154c among the other components of GPS control system 700 is via the local busses 724a, 724b and 724c, respectively, and the master bus 712.

Included within the GPS calibrated imager 252 is electronic circuitry (not shown) which communicates status, control and image data using a camera interface (such as the industry standard camera link interface) via the local bus 266 and the master bus 712 to the computer 702. Other imagers having different interfaces may be used.

The linear motion and position sensor 110 measures the relative lateral linear displacement of the paint carriage 80 with respect to the frame 54 of the vehicle 50. For example, the linear motion and position sensor 110 may be an industrial draw wire sensor manufactured by Micro-Epsilon of Raleigh, N.C. (United States office) having the sensor housing mounted on the frame 54 of the vehicle 50 and the flexible steel (Teflon coated) cable 112 affixed to the side frame member 118 at the attachment point 114 of the paint carriage 80. The linear motion and position sensor 110 may also be a laser range finder affixed to the frame 54 and focused on a reflective target mounted on the inside of the side frame member 118 of the paint carriage 80, or a linear variable differential transformer (LVDT). Position and other data are communicated to and from the linear motion and position sensor 110 via the local bus 716, which then becomes a member of the master bus 712.

Thus it is understood that the relative lateral positional movement of the paint carriage 80 with respect to the frame 54 is determined by the linear motion and position sensor 110, and relative distances moved by the paint carriage 80 can be calculated from differences in position locations. Additionally, the GPS position of the paint carriage 80 relative to a chosen vehicle coordinate system is conventionally determined taking into account positional offsets, and therefore the GPS positions of each paint and bead nozzle as well as their respective projections onto the roadway surface 4 are determined relative to a chosen vehicle coordinate system, again taking into account their respective positional offsets. It is also understood that the absolute GPS position of the paint carriage 80 and each of the paint nozzles 84 and 86 and the reflective bead nozzles 88 and 90 as well as their respective projections onto the roadway surface 4 are known, again taking into account their respective positional offsets which have been conventionally determined.

The electric motor 414, as previously mentioned, is a high torque low speed preferably direct drive permanent magnet synchronous (PMSM) motor. Having a direct drive motor with a hollow shaft allows for a simple retrofit installation while maintaining the same lateral movement of the paint carriage 80 for a given manual or motor powered shaft 417 rotation. The electric motor 414 further has a shaft encoder (not shown) for determining the angular position of the shaft 417 of the electric motor 414, and therefore the angular position of the spline shaft of the hydraulic steering control unit 410. The shaft encoder may, for example, be an optical or magnetic shaft encoder.

Internal to the electric motor 414 is the programmable motor controller 413 which externally communicates via the local bus 421 with the computer 702, and may be programmed by the computer 702 via signals sent onto the local bus 421 to control the rotational position, velocity, or torque of the shaft 417 of the electric motor 414 and therefore the splined shaft of the hydraulic steering control unit 410. Additionally, the computer 702 may request and receive motor bus operating voltage, current, operating temperature, encoder position and other data from the programmable controller 413.

The computer 702 has communication ports such as universal serial buses (USB) for communicating with external peripherals such as external memory, memory sticks and other USB compatible peripherals. Additional communication ports are provided which may include wired ports, such as Ethernet, EIA-232, EIA-422, EIA-485, etc. and wireless ports such as Wi-Fi, Bluetooth, etc. to communicate with system components which have like communication protocols.

The computer 702 additionally has internally available peripheral component interconnect (PCI) expansion slots and/or peripheral component interconnect express (PCIe) expansion slots. For example, the computer 702 may be provided with a PCIe input-output board inserted into a PCIe compatible expansion slot for sending digital control signals from computer 702 to external peripherals, such as roadway mark material pressurized air control system 160 and for receiving digital signals from external peripherals to the computer 702.

The computer 702 further includes the image acquisition system 726 for interfacing the GPS calibrated imager 252 with the computer 702. The image acquisition system 726 may include a frame grabber PCIe expansion slot compatible image frame grabber card such as model number NI PCIe-1433, a high performance camera link frame grabber card manufactured by National Instruments Corporation of Austin, Tex. The image acquisition system 726 also includes a random access memory (RAM) buffer for storing acquired images from the GPS calibrated imager 252, and handles all of the software overhead (control, image data transfers, etc.) for interfacing the GPS calibrated imager 252 to the computer 702.

The image acquisition system 726 further has the external image trigger input 728. The image acquisition system 726 in response to an external trigger signal placed onto the external image trigger input 728, sends a control signal to the GPS calibrated imager 252 via master bus 712 and the local bus 266 to acquire or otherwise "snap" an image. Image data (pixel grayscale and location values) are then transferred from the GPS calibrated imager 252 to the on board buffer memory of image acquisition system 726 via the respective busses and then subsequently transferred to a data memory 806 (shown in FIG. 8) of the computer 702. Image acquisition system 726 may also respond to software instructions from the computer 702 to acquire image data from the GPS calibrated imager 252.

An external trigger source (not shown) generates and accurately controls the timing of the external trigger signal placed on the external image trigger input 728 and may be programmed by the computer 702 to produce various trigger signals. For example, the trigger source may be programmed to generate a periodic trigger signal. In response to the periodic trigger signal, the GPS calibrated imager 252 acquires a sequence of images having accurate and known time intervals between each acquired image. A sequence of images may then be acquired in response to a deterministic external trigger signal. The trigger source may be a programmable signal generator, or may be derived from the computer internal timer, a timing module 730, an external microcontroller based system or any of the GPS receiver modules 154a, 154b or 154c (GPS receivers typically output a 1 pulse per second signal), or from the image acquisition system 726.

Therefore, it is understood that images may be acquired by the GPS calibrated imager 252 and placed into the data memory 806 of the computer 702 in response to the occurrence of an external or internally generated (i.e., by software) deterministic trigger signal, the timing of which may be accurately maintained and controlled by the trigger source or the computer 702, respectively. The acquired image is stored in the data memory 806 as an array of grayscale (or color) values having a one to one correspondence to the pixel array. For example, a CCD sensor having a 640×480 pixel array will output a 640×480 array of grayscale values (which matches the pixel array). Further it is understood that every pixel of the image produced by the driver side imager 60 (or the passenger side imager 65) has a corresponding absolute GPS geographic location (imagers 60 and 65 have been GPS calibrated).

The computer 702 additionally includes the timing module 730 which may be programmed either by the computer 702 or by an external programming source via signals placed on a line 732 to perform certain timing tasks.

The synchronization system 113 synchronizes GPS derived location data with the driver side imager 60 data so that the absolute GPS location of each image (and each pixel) and the respective imaged object is known, and is in bidirectional communication with each component of the GPS control system 700 via the local bus 109 and the master bus 712.

Figure 8:
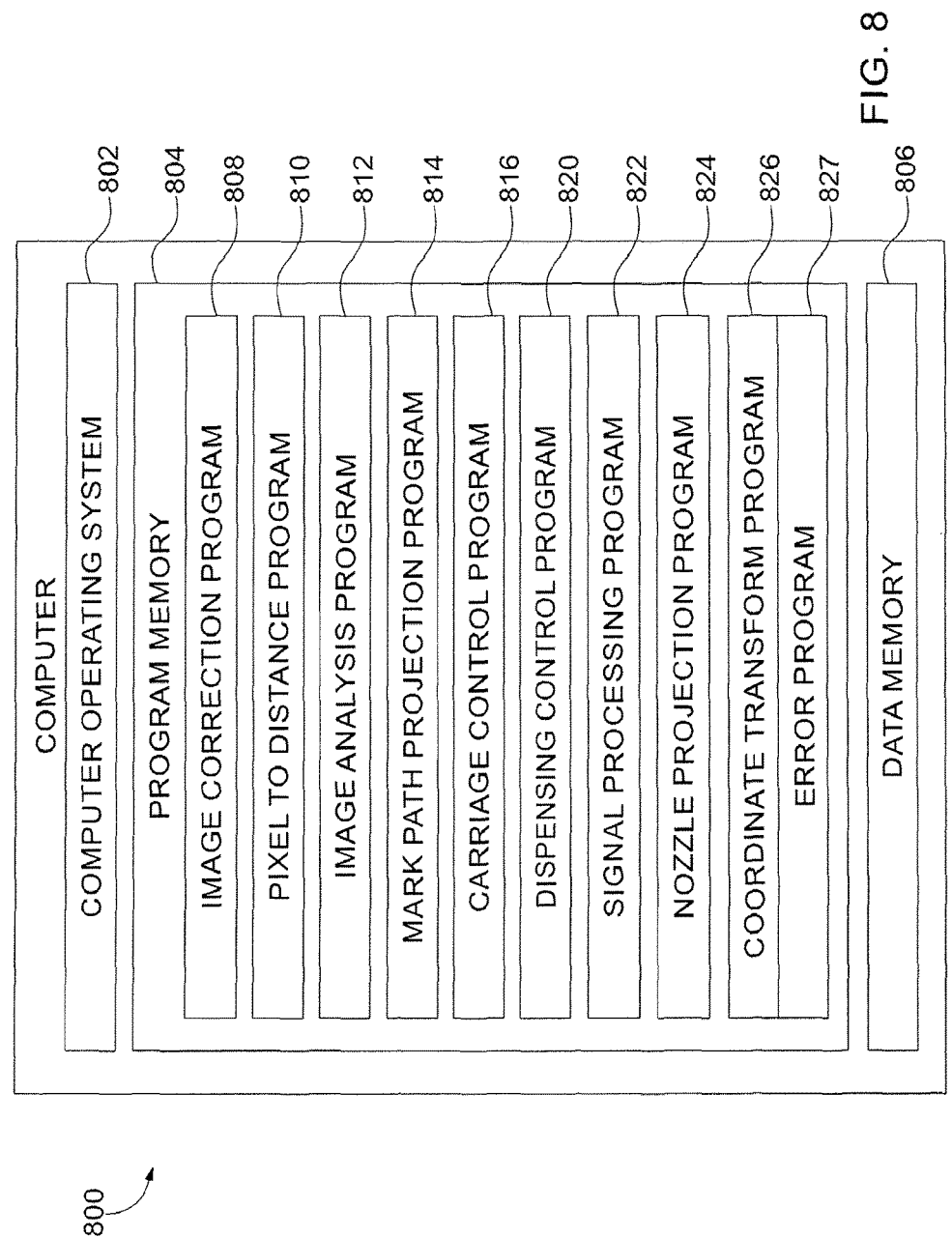
FIG. 8 is a block diagram of software elements of an embodiment of the present invention.

Referring additionally now to FIG. 8, a block diagram of memory 800 of the computer 702 is shown and includes operating system software 802 for managing hardware resources and other tasks for the computer 702, the program memory 804 having a number of software programs for performing tasks according to an embodiment of the invention, and the data memory 806 for storing system data including image data from the driver side imager 60.

The operating system software 802 may include a real time operating system (RTOS), UNIX, LINUX, Windows (offered by Microsoft Corporation), or other compatible operating system software, and performs operating system software functions and is capable of executing various programs stored in the program memory 804 of the computer 702.

The program memory 804 includes an image correction program 808, pixel to distance program 810, an image analysis program 812, a mark path projection program 814, a carriage control program 816, a dispensing control program 820, a signal processing program 822, a nozzle projection program 824, a coordinate transform program 826, and an error program 827.

The image correction program 808 inputs raw image data from the GPS calibrated imager 252 and subsequently corrects the raw image for optical pin-cushion (not shown) or barrel distortion produced by the lens 260 (and possibly the protective globe 256) and then secondly corrects for perspective distortion. Data for performing image correction has been previously obtained using image calibration techniques well known in machine vision and image processing technology. For example, a well-known imager calibration algorithm for correcting lens distortion is available from The MathWorks, Inc. of Natick, Mass.

The pixel to distance transformation program 810 transforms each pixel's u-v coordinate of the undistorted image into an equivalent absolute GPS coordinate object distance (for example, one pixel in image space in the u-axis direction of the corrected image may correspond to 0.25 inches in object space in the x-direction), and each pixel is referenced to a fixed point on the vehicle 50. The u-v image coordinate system is conventionally defined. This fixed reference point on the vehicle 50 may be the location of GPS antenna 152a, or any other convenient fixed point on vehicle 50, such as the origin of Cartesian coordinate system 52.

In particular, the pixel to distance transformation program 810 may determine the object space coordinates of the image space origin of the undistorted image from which all other pixel coordinates in object space may be determined. Data necessary for performing this transformation are again experimentally determined from known object space dimensions of an imaged checker-board pattern. Thus, every pixel of the image may have an equivalent location in object space referenced to the vehicle Cartesian coordinate system 52, and therefore the absolute GPS location of the object point represented by a pixel is known, or any other points on the vehicle 50 (offset corrected). Program 810 also transforms a known absolute GPS object space location into the equivalent image space location.

Image analysis program 812 determines both the beginning and ending edges, and the centers of the beginning and ending edges, of the image of roadway mark segment 18 using image processing algorithms well known in the art, and also determines the absolute GPS object space coordinates of these using data from pixel to distance program 810. Additionally, program 812 determines the image space coordinates of the laser line pattern 106 image (or dot) and determines its corresponding GPS absolute object space coordinates.

The mark path projection program 814 computes the path projection of the roadway mark path 16 in absolute GPS coordinates from the predetermined GPS mark path data 1560 (referenced in FIG. 9A), and also determines a smooth, best fit continuous mathematical function between the predetermined GPS mark path data. Additionally, the mark path projection program 814 may also calculate the roadway mark path 16 location in image space using the pixel to distance program 810.

Carriage control program 816 controls the lateral movement of the paint carriage 80 based upon an error signal 1535 (referenced in FIG. 9A) and sends motor acceleration, angular velocity and position commands to the electric motor 414 to achieve the desired nozzle projection position for dispensing roadway marking material (such as paint) to minimize error signal 1535.

The dispensing control program 820 controls the pressurized air control system 160 and determines which solenoid valves to activate and the time duration. Turn-on and turn-off delays in turning on and turning off all valves are also compensated for using data made available from the solenoid valve manufacturers. The dispensing times for the paint and reflective nozzles are determined by the roadway mark characteristic data stored in memory 806 with the corresponding absolute GPS location data of the roadway mark. For example, dispensing control program 820 will dispense paint to duplicate roadway mark segment 18 from the beginning absolute GPS location of beginning lateral edge line 42 to the ending lateral edge line 46. Thus, the dispensing control program 820 may control the marking of a single solid line, single skip line, or double lines (solid, dashed or a combination) onto the roadway surface 4.

The signal processing program 822 receives a steam of discrete GPS coordinates of GPS antennas 152 from GPS receivers 154. The program takes the most recent point, plus a collection of previous GPS coordinates stored in data memory 806, to create a filtered and corrected stream of discrete GPS coordinates using software. The filtering may be performed in software as in the signal processing program 822, or could be implemented in hardware or a combination of software and hardware. The output of signal processing program 822 are filtered GPS antenna locations and contain less noise than that obtained from using just the "raw" (i.e., only the signals from the GPS receiver modules). For GPS control system 700, the signal processing program 822 may include filtering software to perform a simple moving average, a cumulative moving average, a weighted moving average, an exponential moving average, etc. Another embodiment of a GPS-based control system includes additional sensor hardware to implement a Bayesian model based filter for filtering GPS data. Such implementations include Kalman and Kalman-like filters and are further discussed with reference to FIG. 12.

Figure 9A:
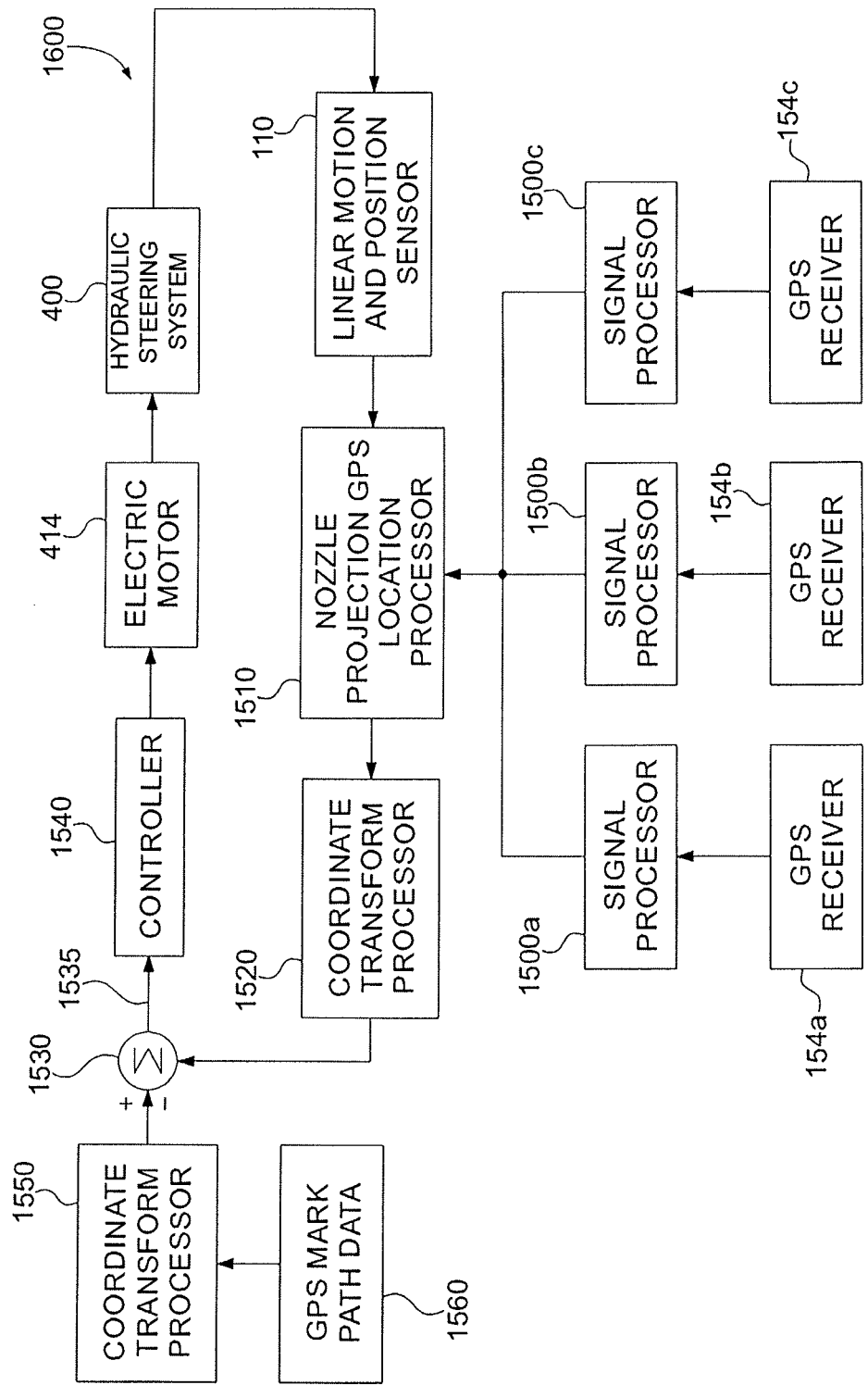
FIG. 9A is a block diagram of the nozzle positioning control system of an embodiment of the present invention showing individual GPS signal processors.
Figure 9B:
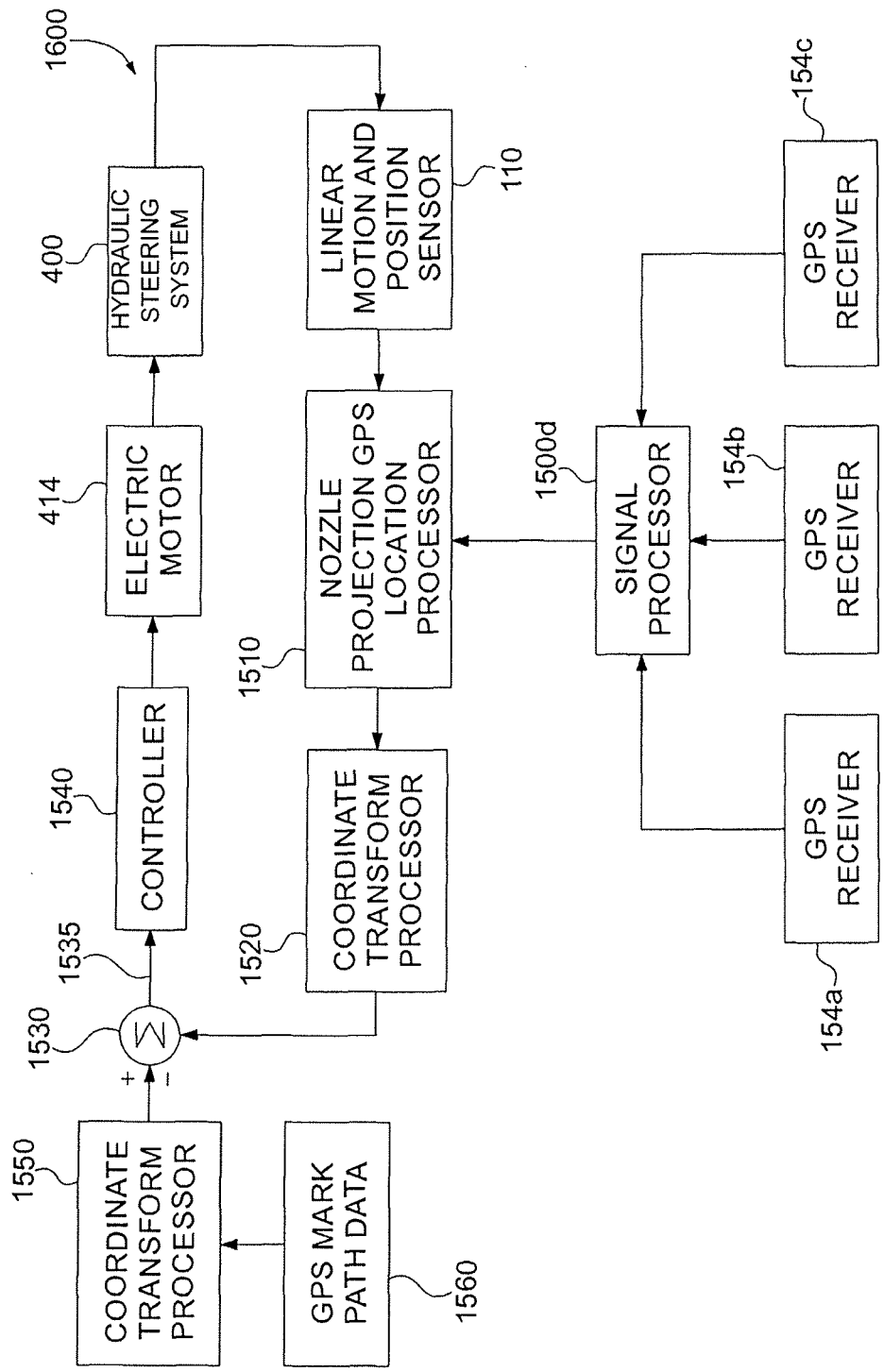
FIG. 9B is a block diagram of the nozzle positioning control system of an embodiment of the present invention showing a single combined GPS signal processor.

In the exemplary embodiment, the nozzle projection program 824 receives the three or more streams of time synchronized discrete GPS coordinates from signal processors 1500a, 1500b, 1500c (referenced in FIGS. 9A and 9B). Less than three streams of GPS coordinates may be received in embodiments including less than three GPS antennas 152 and GPS receivers 154. The program 824 uses these streams to determine the truck position and attitude, creating a local Cartesian coordinate system origin (offset corrected) in GPS absolute coordinates. By using offset calibration parameters stored in the data memory 806 and readings from the linear motion and position sensor 110, the program determines the absolute GPS location of the paint carriage 80, thereby also determining the absolute GPS location of the projection of the paint nozzles 84 and 86 and reflective bead nozzles 88 and 90 onto the roadway surface 4. Alternately, the nozzle projection program 824 may input an image from the GPS calibrated imager 60 and determine the absolute GPS location of the imaged laser line pattern 106 (or dot) and, from this image data, determine the absolute GPS location of the projection of the nozzle onto the roadway surface 4 using program 810. The tasks performed by the nozzle projection program 824 may also be performed by hardware, or a combination of hardware and software, and irrespective of its implementation is referred to as a GPS location processor. equivalent 2-dimensional UTM coordinates.

The error program 827 inputs like coordinate data from two sources and performs a subtraction and, depending upon the difference between like coordinate data, outputs an error signal compatible with controlling electric motor 414.

Referring now to FIG. 9A, a GPS-based improved carriage control system 1600 is shown and comprises the GPS receiver modules 154a, 154b and 154c in communication with the signal processors 1500a, 1500b and 1500c, respectively. Signal processors 1500a, 1500b and 1500c perform signal processing operations on the GPS positional data from their respective GPS receivers. For example, one signal processing operation may include applying a rolling average, rolling linear and Gaussian weighted averages over a number of GPS positional data to reduce the noise component in the GPS data. Another signal processing operation includes filtering the GPS data to eliminate unwanted signals which may be caused by vehicle vibration of known frequencies or positional impulses as the result of irregularities in roadway surface 4 (such as pot holes). The signal processors 1500a, 1500b and 1500c may be implemented in software contained in the signal processing program 822 or may be implemented in hardware, such as a field programmable gate array (FPGA) or dedicated signal processor integrated circuit, and may also be combined into one block 1500d as shown in FIG. 9B. The main function of signal processors 1500a, 1500b and 1500c (or 1500d) is to minimize the variation in GPS positional data as the result of noise sources which corrupt GPS positional data.

Data from each signal processor 1500a, 1500b and 1500c is then received by nozzle projection GPS location processor 1510, which may be implemented in program 824, or alternately may use hardware or a combination of hardware and software. The nozzle projection GPS location processor 1510 also inputs the data from the linear motion and position sensor 110 and, with the processed GPS data from each GPS receiver 154a, 154b and 154c, calculates an absolute GPS location of the paint and bead nozzle projection(s) onto the roadway surface 4 using offsets determined and previously stored in the data memory 806.

Alternatively, image data from imager 60 can be used to determine the absolute GPS location of the paint nozzle 84 and bead nozzle 88 projections onto roadway surface 4, or other positional determining systems may be employed (corrected to account for offsets). For example, the GPS coordinates of laser line image pattern 106 (or dot) may be determined from the image of driver side area 70 using program 810 and further calculations will determine the absolute GPS location of paint nozzle 84 and bead nozzle 86 projections.

The nozzle projection GPS location processor 1510 may be implemented in software using the nozzle projection program 824, or may be implemented in hardware such as a field programmable gate array (FPGA) or dedicated signal processor integrated circuit, or a combination of both hardware and software. The output data from the location processor 1510 is the absolute GPS positional data of the projection of the nozzle(s) onto roadway surface 4.

The output of the nozzle projection GPS location processor 1510 flows to a coordinate transform processor 1520 where the absolute GPS location data of the nozzle projection is transformed to a new coordinate system more appropriate for the control of the paint carriage 80, and which may be performed by coordinate transform program 826. For example, the GPS absolute coordinates of the nozzle projection may be transformed into a two dimensional coordinate system such as Universal Transverse Mercator (UTM) or three dimensional East-North-Up (ENU) coordinate systems. The output of coordinate transform processor 1520 then flows to a comparator 1530.

The predetermined GPS mark path data 1560 defining the roadway mark location is stored as a data block in the data memory 806. The roadway mark location data have been previously obtained by a roadway mark locator. Additionally, the roadway mark characteristic data (indicating a single solid, skip line, double line, double skip, etc.) may also be stored in memory 806 along with the roadway mark location data.

The absolute GPS roadway mark location data are then transferred to coordinate transform processor 1550, which may transform the absolute GPS roadway mark location data into a two dimensional coordinate system such as Universal Transverse Mercator (UTM) or three dimensional East-North-Up (ENU) coordinate systems. The coordinate transform processor 1550 is identical to the coordinate transform processor 1520, and the choice of coordinate system transformations must be the same for both processors 1520 and 1550. For example, if UTM transformation is used as the coordinate transform in the processor 1520 then UTM transformation must be used in the processor 1550, i.e., the data which flows to the comparator 1530 must be equivalent.

Using a UTM two dimensional transformation removes the altitude from the LLA GPS coordinates and significantly simplifies the control calculations for correctly aligning the paint and bead nozzle projections over the roadway mark location.

The comparator 1530 subtracts the transformed absolute GPS coordinates of both the stored roadway mark locations and the absolute GPS coordinates of the nozzle projections and produces error signal 1535. Comparator 1530 may be implemented with error program 827, or could be implemented in hardware using an FPGA or other hardware, or a combination of hardware and software. Error signal 1535 flows to a controller 1540.

The controller 1540, in response to the error signal 1535, commands the electric motor 414 to rotate in a direction which reduces the error signal 1535 (i.e., the distance error) by commanding the hydraulic steering system 400 to move (extend or retract) the paint carriage 80 (and hence the projection of the nozzles onto the roadway surface 4) in a direction to reduce the error signal 1535. Thus, the nozzle projection is aligned on top of the predetermined GPS mark path data 1560. Controller 1540 may be implemented with carriage control program 816, or could be implemented in hardware using an FPGA or other hardware, or a combination of hardware and software.

Referring to FIG. 10, the paint carriage 80 is shown extended and positioned over the roadway surface 4 which has been newly resurfaced/repaved having the outward positioned paint nozzle 84 and outward positioned reflective bead nozzle 88 laterally aligned with a virtual roadway mark outline 18a of pre-existing obliterated roadway mark line segment 18 (which has been removed from the new roadway surface 4 as the result of the repaving process). The virtual roadway mark outline 18a is not visible but has been recreated from roadway mark geographical location and characteristic data previously obtained either by manually laser tracing the pre-existing line or automatically imaging the pre-existing line. In either case, the GPS location of the roadway mark line has been previously determined.

Also shown is roadway mark path 16. As shown in FIG. 10, the virtual roadway mark outline 18a is centered along the roadway mark path 16. As previously stated, the virtual roadway mark outline 18a may include skip, solid or a combination of double lines, but is shown in FIG. 10 as a single roadway mark line for clarity. The laser line pattern 106 is positioned (offset adjusted) to align and position the outward positioned paint nozzle 84 and the outward positioned reflective bead nozzle 86, respectively, over the virtual roadway mark outline 18a. Alternatively, the linear motion and position sensor 110 may be used to accurately determine the position of the paint carriage 80 and hence position of the outward positioned paint nozzle 84 and the outward positioned reflective bead nozzle 86, respectively (offset adjusted).

As the driver of the vehicle 50 proceeds along the roadway mark path 16, visible indicia (dots) 17 are dispensed upon the resurfaced/repaved roadway surface 4. The visible indicia 17 is a roadway line characteristic (similar to a solid or dashed line, but comprises dots) and may be later used as a visual guide by the operator of the vehicle 50 for manually placing the new roadway mark onto the roadway referenced to the roadway mark path 16. Alternatively, the actual roadway mark segment 18 may be duplicated using previously obtained roadway mark characteristic data such as skip line pattern etc. previously determined and stored in data memory 806 along with the absolute GPS location of the roadway mark.

Figure 11A:
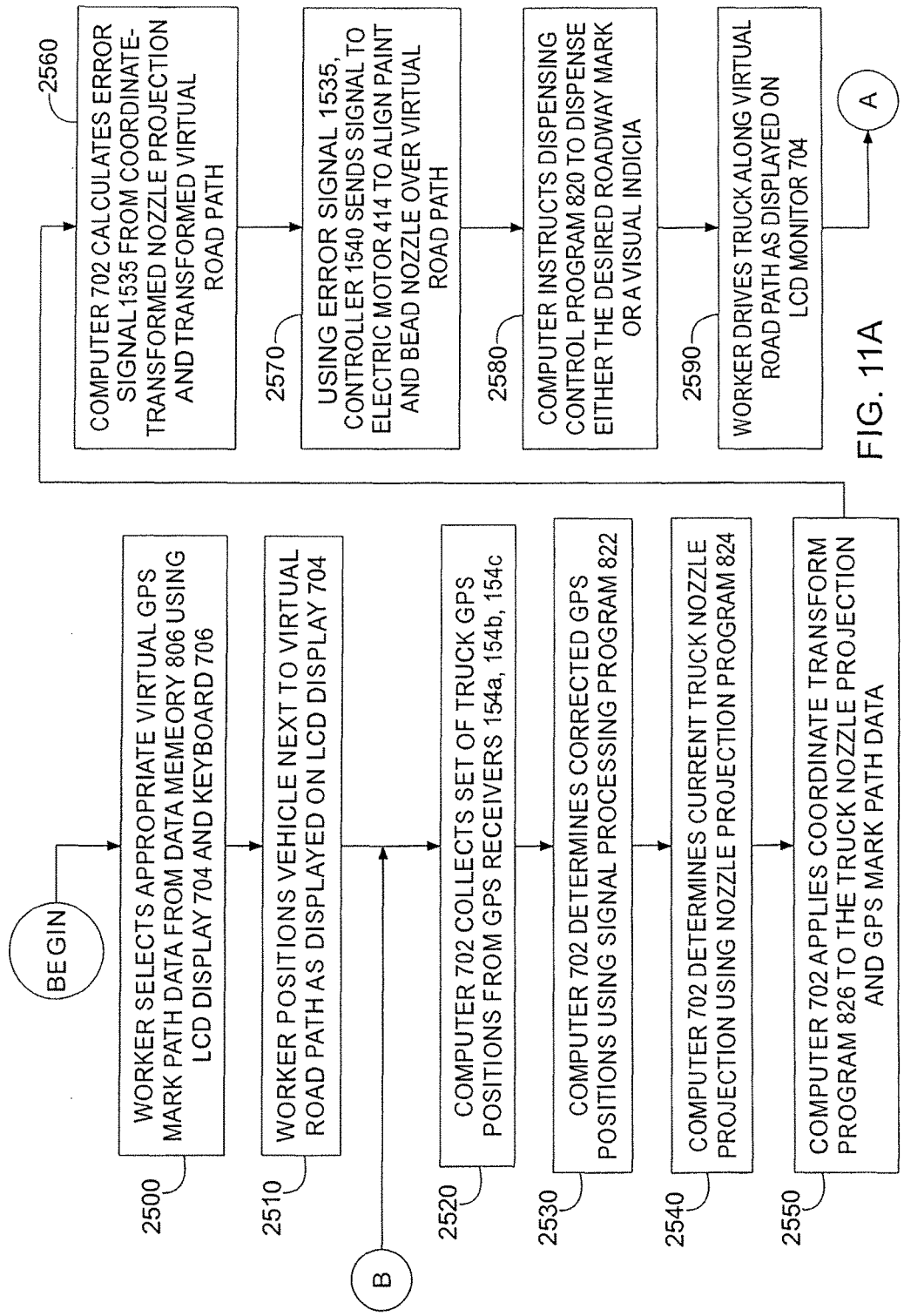
FIGS. 11A and 11B are operational flow charts of an embodiment of the present invention.
Figure 11B:
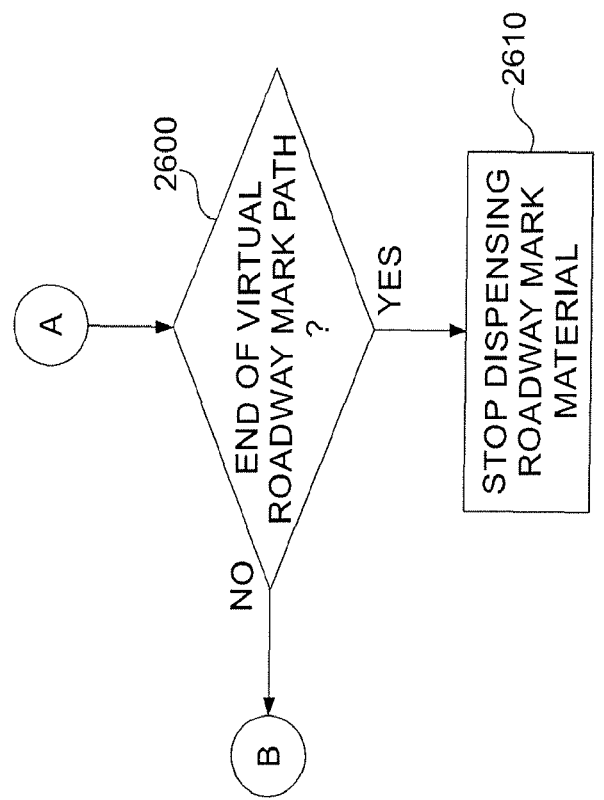

Referring now to FIG. 11, an operational flowchart is depicted which illustrates the operation of the invention.

Operation begins with the step 2500 having an operator (worker) on vehicle 50 select the appropriate virtual GPS mark path location data from the data memory 806 using the display 704 and the keyboard 706. The data memory 806 may include one or more GPS mark path location data sets. Operational flow then proceeds to step 2510.

In step 2510, the operator positions the vehicle 50 next to the virtual GPS mark path location as indicated on the display 704. Operational flow then proceeds to step 2520.

In step 2520, the computer 702 inputs the first set of GPS antenna positions from GPS receivers 154a, 154b and 154c. Operational flow then proceeds to step 2530.

In step 2530, the computer 702 computes the filtered (corrected) GPS location positions using signal processing program 822. Operational flow then proceeds to step 2540.

In step 2540, the computer 702 determines the current nozzle projection using nozzle projection program 824. Operational flow then proceeds to step 2550.

In step 2550, the computer 702 applies the coordinate transform program 826 to both the absolute GPS nozzle projection location data and the virtual GPS road mark location data. Operational flow then proceeds to step 2560.

In step 2560, the computer 702 calculates an error distance from the coordinate transformed nozzle projection data and the coordinate transformed virtual GPS road mark location data using the error program 827. Operational flow then proceeds to step 2570.

In step 2570, the computer 702 sends an error correcting signal to electric motor 414 via the carriage control program 816 to rotate in a direction which minimizes the error signal 1535. In response to the error signal 1535, the electric motor 414 rotates in a direction which turns the hydraulic steering control unit 410 in a direction which forces the paint carriage 80 to move in direction 441 (extending the paint carriage 80 from vehicle 50) or direction 442 (retracting the paint carriage 80 into vehicle 50) to minimize error signal 1535. Operational flow then proceeds to step 2580.

In step 2580, the computer 702 instructs dispensing control program 820 to dispense roadway mark material for either duplicating a roadway mark (i.e., single line, solid or dashed, or a double line, single or dashed, or a combination of both). The length of the roadway mark is determined by the beginning GPS location data and ending GPS location data of the roadway line segment. Additionally, layout indicia (dots) 17 (see FIG. 10) used for layout work may also be dispensed instead of the actual roadway mark. Operational flow then proceeds to step 2590.

In step 2590, the operator continues to drive the vehicle 50 along the roadway mark path 16 as displayed on the display 704. Operational flow then proceeds to step 2600.

In step 2600, the computer 702 compares the current paint nozzle 84 GPS projection location with the ending virtual GPS location of the virtual roadway mark. If both locations are equal, operational flow then proceeds to step 2610. If the locations are not equal, operational flow then proceeds back to step 2520.

In step 2610, the computer 702 instructs the dispensing control program 820 to stop dispensing roadway mark material.

Figure 12:
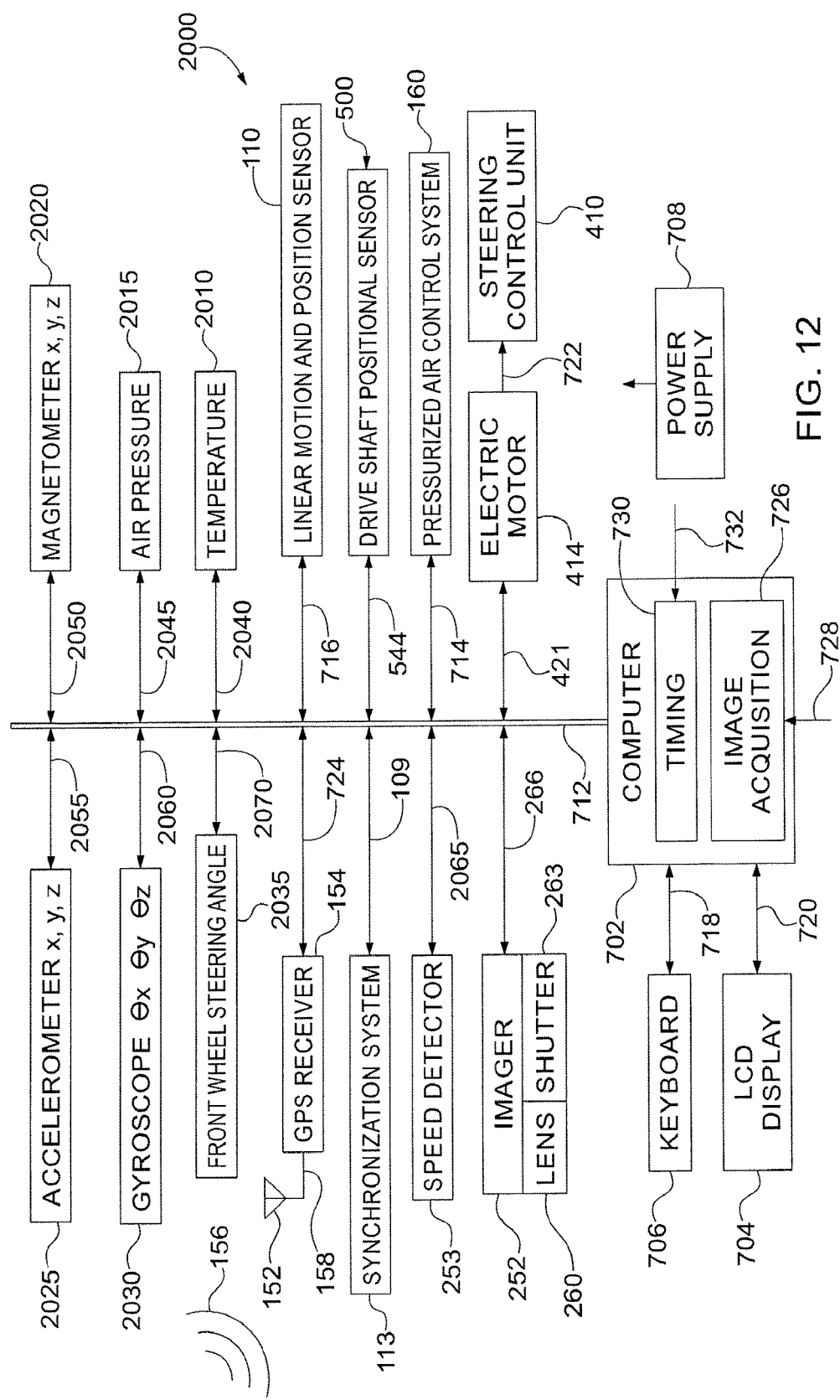
FIG. 12 is schematic block diagram of a control system of an embodiment of the invention for replicating roadway marks or placing visible guide indicia onto a roadway surface using a Bayesian model based filter.

Referring now additionally to FIG. 12, another embodiment of a GPS-based control system 2000 for the paint carriage 80 is shown and includes the computer 702, the display 704, the keyboard 706, the GPS calibrated imager 252, vehicle speed detector 253, one or more GPS antennas 152 and cooperating receiver modules 154, the pressurized air control system 160, the electric motor 414, the steering control unit 410, the power supply 708, the synchronization system 113, the drive shaft positional sensor 500, the linear motion and position sensor 110, a temperature sensor 2010, an air pressure sensor 2015, a magnetometer sub-system 2020, an accelerometer sub-system 2025, a gyroscope sub-system 2030, and the front wheel steering angle sensor 2035.

All of the above components are in bi-directional communication with each other via their respective local busses and master bus 712. For example, synchronization system 113 is in bi-directional communication with every component via its local bus 109 and master bus 712.

The accelerometer sub-system 2025 includes accelerometer sensors for each of the Cartesian coordinate system 52 axis x, y, and z, and measures the acceleration of the vehicle 50 for each axis and also computes the velocity and position for each axis (all derived from the acceleration data). The gyroscope sub-system 2030 includes gyroscope sensors for measuring the rotational acceleration about each x, y and z axis and also computes angular velocity, the Euler angle orientation, and conventionally defined roll, pitch and yaw angles of the vehicle 50. The magnetometer sub-system 2020 includes conventional magnetometer sensors to determine the Earth's magnetic field in the x, y and z directions and computes the direction and magnitude of the magnetic field with respect to the vehicle Cartesian coordinate system 52. The air pressure sensor 2015 measures the atmospheric air pressure and the temperature sensor 2010 measures the ambient temperature. Both air pressure and temperature sensors are of conventional design.

The front wheel steering angle sensor 2035 measures the angle of the front wheels with respect to the forward direction of the vehicle 50. Steering wheel steering angle may be obtained from a steering wheel sensor of conventional design using, for example, optical or magnetic rotational sensors manufactured by SKF or Bosch.

It is specifically noted that the accelerometer sub-system 2025, the gyroscope sub-system 2030, the magnetometer sub-system 2020, the air pressure sensor 2015, the temperature sensor 2010, the front wheel steering angle sensor 2035 and a speed detector 253 are all in bi-directional communication with all other components via local busses 2055, 2060, 2050, 2045, 2040, 2070, and 2065, respectively, and the master bus 712. It is specifically noted that the computer 702 may access all sensor data including vehicle speed data from the speed detector 253.

Speed detector 253 determines the speed of the vehicle 50 which may be determined by conventional mechanisms such as an electronic speedometer. The speed of the vehicle 50 may also be determined by the computer 702 from the known distance travelled using GPS coordinates and the time it takes for the vehicle 50 to travel the known distance, or using the distance per pulse ratio and counting the a total number of pulses along with the associated time interval.

With the additional hardware components including the speed detector 253, the temperature sensor 2010, the air pressure sensor 2015, the magnetometer sub-system 2020, the accelerometer sub-system 2025, the gyroscope sub-system 2030 and the front wheel steering angle sensor 2035, a Bayesian model-based filter may be implemented in software, and specifically, a Kalman or Kalman-like filter may be implemented to further reduce noise inherent in the raw GPS location data. To implement a Kalman or Kalman-like filter additionally requires a vehicle kinematic model 2740 (using physical laws of motion) of the vehicle 50 which is stored in the data memory 806.

Figure 13:
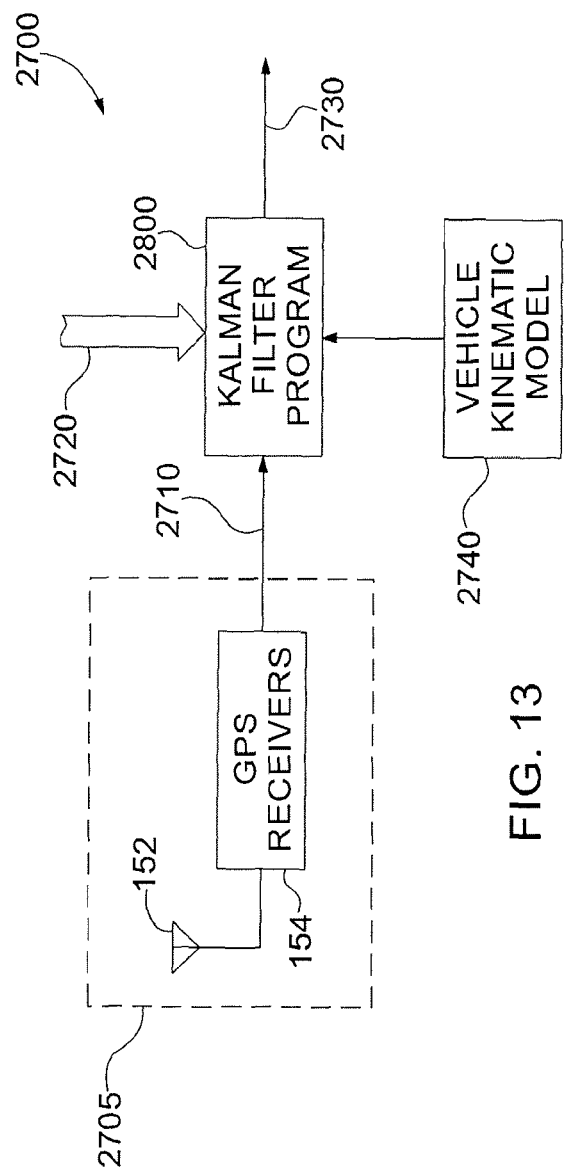
FIG. 13 is a block diagram illustrating the application of the Kalman filter in an embodiment of the present invention.

Referring to FIG. 13, a block diagram 2700 illustrates the application of the software based Kalman filter 2800 stored in the signal processing program 822 for determining filtered GPS location data 2730 from the raw GPS location data 2710 produced by a GPS system 2705. The GPS system 2705 may have one or more GPS antennas and cooperating receiver modules. The arrow 2720 represents the sensor outputs from the accelerometer sub-system 2025, the gyroscope sub-system 2030, the magnetometer sub-system 2020, the air pressure sensor 2015, the temperature sensor 2010, the front wheel steering angle sensor 2035 and the speed detector 253 which are used by the software-based Kalman filter 2800 to calculate corrected, less noisy and filtered GPS location data 2730.

Figure 14:
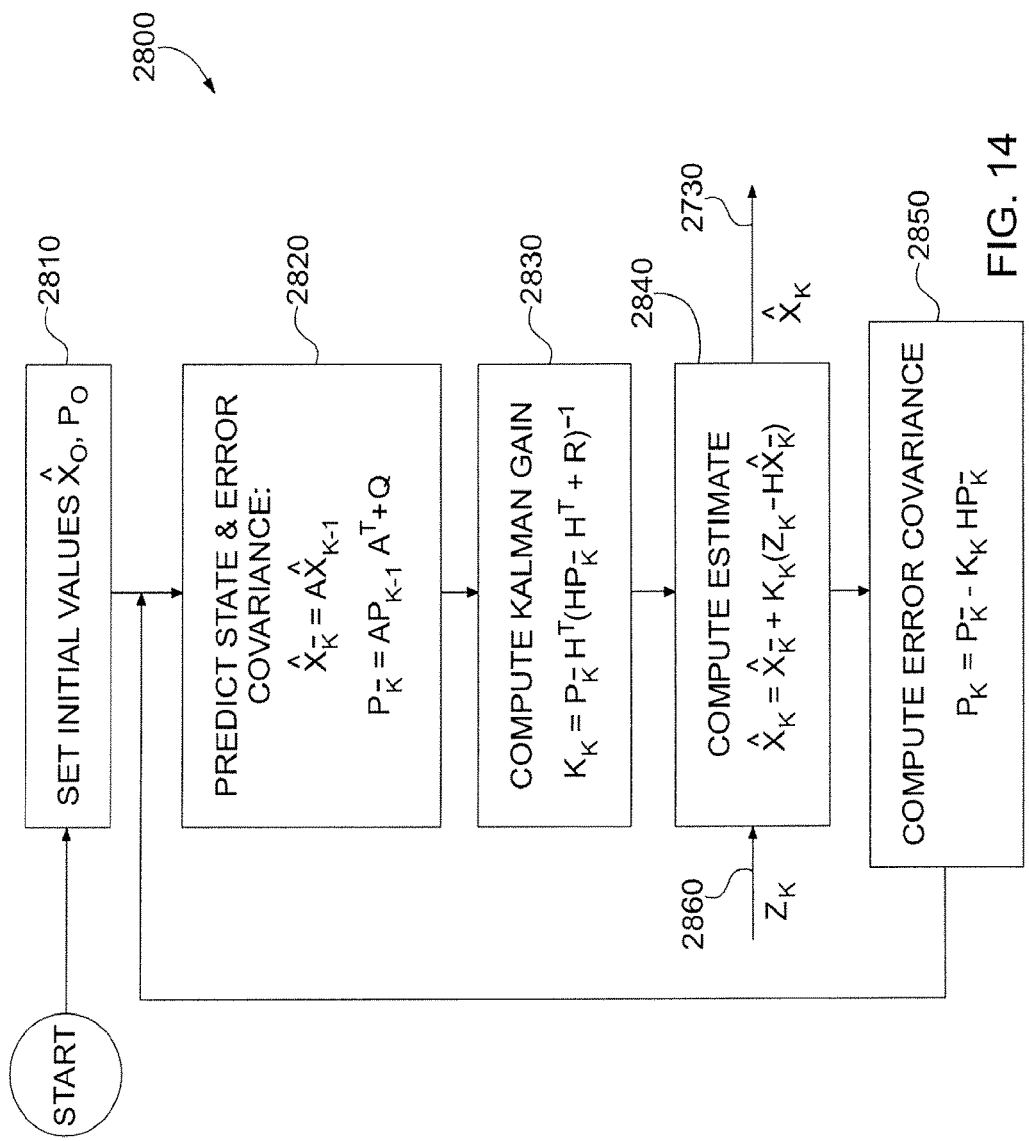
FIG. 14 is a block diagram illustrating an example of the Kalman filter algorithm.

Referring now additionally to FIG. 14, an example algorithm of the software based Kalman filter 2800 is illustrated.

In step 2810, the initial values for the state X and error covariance P (respectively $X_0$ and $P_0$) are input into the software based Kalman filter 2800 (for initial values k=0). Operational flow then continues to step 2820.

In step 2820, the predicted state $\bar{\bar{X}}_k$ and the predicted error covariance $P_{\bar{k}}$ at a current time k are computed based upon the previous values of X and P (i.e., $\bar{\bar{X}}_{k-1}$ and $P_{k-1}$). The variable A represents the state transition matrix and the variable Q is the covariance matrix of the state transition noise. The matrix A contains the equations of motion of the system. Operational flow then continues to step 2830.

In step 2830, the Kalman gain $K_k$ is determined from the predicted error covariance. The variable H represents the state to measurement matrix and the variable R represents the covariance matrix of the measurement noise. Operational flow then continues to step 2840.

In step 2840, an estimate of the current state $\bar{\bar{X}}_k$ is computed using the Kalman gain computed in step 2830. $Z_k$ 2860 represents sensor measurement data and raw GPS location data 2710 input. Filtered GPS location data $X_k$ 2730 are output from this step. Operational flow then continues to step 2850.

In step 2850, the current error covariance $P_k$ is computed using the Kalman gain computed in step 2830 and the predicted error covariance $P_{\bar{k}}$ computed in step 2820. Operational flow then continues back to step 2820.

As previously mentioned, an inertial navigation system manufactured by Advanced Navigation incorporates two GPS receiver modules and cooperating antennas along with a temperature sensor, an air pressure sensor, a magnetometer sub-system, an accelerometer sub-system, and a gyroscope sub-system. Provisions are also made for accepting the speed of the vehicle 50.

The foregoing description of exemplary embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

We claim:

1. A global positioning system (GPS)-based control system for positioning a material dispensing nozzle over a predetermined roadway mark path located on a roadway surface comprising:
    a vehicle having an attached paint carriage which is laterally movable which respect to the vehicle;
    a material dispensing nozzle attached to the paint carriage;
    a first GPS antenna mounted on the vehicle;
    a second GPS antenna mounted on the vehicle;
    a third GPS antenna mounted on the vehicle;
    a first GPS receiver responsive to the first GPS antenna;
    a second GPS receiver responsive to the second GPS antenna;
    a third GPS receiver responsive to the third GPS antenna;
    a first signal processor responsive to the first GPS receiver for determining a geographical location of the first GPS antenna;
    a second signal processor responsive to the second GPS receiver for determining the geographical location of the second GPS antenna;
    a third signal processor responsive to the third GPS receiver for determining the geographical location of the third GPS antenna,
    a linear motion and position sensor for determining a relative lateral linear displacement of the paint carriage with respect to the vehicle;
    a GPS location processor responsive to the first signal processor and to the linear motion and position sensor for determining an absolute GPS location of the material dispensing nozzle, wherein the GPS location processor is further responsive to the second signal processor and the third signal processor for determining the absolute GPS location of the material dispensing nozzle;
    a coordinate transform processor for transforming the absolute GPS location of the material dispensing nozzle into a location in a coordinate system other than GPS;
    a comparator device for comparing the location of the material dispensing nozzle in the coordinate system other than GPS to a desired roadway mark path according to the coordinate system other than GPS; and
    a control system, including a computer, responsive to the comparator device for controllably positioning the material dispensing nozzle over the predetermined roadway mark path by laterally moving the paint carriage.

2. The GPS-based control system of claim 1 wherein the first signal processor is configured to perform filtering operations on geographical data of the first GPS antenna.

3. The GPS-based control system of claim 2 wherein the first signal processor is configured to perform filtering operations on the geographical data of the first GPS antenna which includes one or more of a rolling average, a rolling linear average, and a Gaussian weighted average over a number of GPS positional data.

4. The GPS-based control system according to claim 3 wherein the first signal processor is configured to perform Bayesian model based filtering operations on the geographical data of the first GPS antenna.

5. The GPS-based control system according to claim 4 wherein the first signal processor is configured to perform Kalman filtering operations on the geographical data of the first GPS antenna.

6. The GPS-based control system of claim 1, wherein the coordinate system other than GPS is a Universal Transverse Mercator coordinate system or an East-North-Up coordinate system.

7. The GPS-based control system of claim 1, wherein the coordinate transform processor is further configured to transform a desired GPS roadway mark path into the desired roadway mark path according to the coordinate system other than GPS.

8. The GPS-based control system of claim 1, wherein the control system includes a hydraulic steering control unit.

9. The GPS-based control system of claim 8, wherein the hydraulic steering control unit is electrically controllable.

10. The GPS-based control system of claim 1, wherein:
the comparator device is configured to produce an error signal based on a difference between the location of the material dispensing nozzle in the coordinate system other than GPS and the desired roadway mark path according to the coordinate system other than GPS, and
the control system is configured to move the paint carriage laterally to reduce the error signal.

11. A method for positioning a material dispensing nozzle which is attached to a paint carriage which is attached to, and laterally movable with respect to, a vehicle onto a predetermined roadway mark path located on a roadway surface, the method comprising:
determining a geographical location of a first global positioning system (GPS) antenna mounted on the vehicle and responsive to a first GPS receiver using a first signal processor responsive to the first GPS receiver;
determining the geographical location of a second GPS antenna mounted on the vehicle and responsive to a second GPS receiver using a second signal processor responsive to the second GPS receiver;
determining the geographical location of a third GPS antenna mounted on the vehicle and responsive to a third GPS receiver using a third signal processor responsive to the third GPS receiver,
determining a relative lateral displacement of the paint carriage with respect to the vehicle using a linear motion and position sensor;
determining an absolute GPS location of the material dispensing nozzle using a GPS location processor responsive to the first signal processor and to the linear motion and position sensor, wherein the GPS location processor is further responsive to the second signal processor and the third signal processor;
transforming the absolute GPS location of the material dispensing nozzle into a location in a coordinate system other than GPS using a coordinate transform processor;
comparing the location of the material dispensing nozzle in the coordinate system other than GPS to a desired roadway mark path according to the coordinate system other than GPS; and
moving the paint carriage laterally with respect to the vehicle based on the comparison between the location of the material dispensing nozzle in the coordinate system other than GPS to move the material dispensing nozzle over a desired roadway mark path according to the coordinate system other than GPS.

12. The method of claim 11, wherein the coordinate system other than GPS is a Universal Transverse Mercator coordinate system or an East-North-Up coordinate system.

13. The method of claim 11, further comprising transforming a desired GPS roadway mark path into the desired roadway mark path according to the coordinate system other than GPS using the coordinate transform processor.

14. The method claim 11, wherein the paint carriage is moved by a control system including a hydraulic steering control unit.

15. The method of claim 14, further comprising:
producing an error signal based on a difference between the location of the material dispensing nozzle in the coordinate system other than GPS and the desired roadway mark path according to the coordinate system other than GPS,
wherein the control system moves the paint carriage laterally to reduce the error signal.

16. A global positioning system (GPS)-based control system for positioning a material dispensing nozzle over a predetermined roadway mark path located on a roadway surface comprising:
a vehicle having an attached material dispensing nozzle which is laterally movable with respect to the vehicle;
a first GPS antenna mounted on the vehicle;
a second GPS antenna mounted on the vehicle;
a third GPS antenna mounted on the vehicle;
a first GPS receiver responsive to the first GPS antenna;
a second GPS receiver responsive to the second GPS antenna;
a third GPS receiver responsive to the third GPS antenna;
a first signal processor responsive to the first GPS receiver for determining a geographical location of the GPS antenna;
a second signal processor responsive to the second GPS receiver for determining the geographical location of the second GPS antenna;
a third signal processor responsive to the third GPS receiver for determining the geographical location of the third GPS antenna,
a linear motion and position sensor for determining a relative lateral linear displacement of the material dispensing nozzle with respect to the vehicle;
a GPS location processor responsive to the first signal processor and to the linear motion and position sensor for determining an absolute GPS location of the material dispensing nozzle, wherein the GPS location processor is further responsive to the second signal processor and the third signal processor for determining the absolute GPS location of the material dispensing nozzle;
a coordinate transform processor for transforming the absolute GPS location of the material dispensing nozzle into a location in a coordinate system other than GPS;
a comparator device for comparing the location of the material dispensing nozzle in the coordinate system other than GPS to a desired roadway mark path according to the coordinate system other than GPS; and
a control system, including a computer, responsive to the comparator device for controllably positioning the material dispensing nozzle over the predetermined roadway mark path.

17. A global positioning system (GPS)-based control system for positioning a material dispensing nozzle over a predetermined roadway mark path located on a roadway surface comprising:
a vehicle having an attached paint carriage which is laterally movable which respect to the vehicle;
a material dispensing nozzle attached to the paint carriage;
a first GPS antenna mounted on the vehicle;
a second GPS receiver responsive to the second GPS antenna;
a third GPS receiver responsive to the third GPS antenna;
a linear motion and position sensor for determining a relative lateral linear displacement of the material dispensing nozzle with respect to the vehicle;
a first GPS receiver responsive to the first GPS antenna;
a second GPS receiver responsive to the second GPS antenna;
a third GPS receiver responsive to the third GPS antenna;
a computer configured to:
determine a geographical location of the first GPS antenna based on an output of the first GPS receiver;

determine an absolute GPS location of the material dispensing nozzle based on the geographical location of the first GPS antenna and an output of the linear motion and position sensor;

transform the absolute GPS location of the material dispensing nozzle into a location in a coordinate system other than GPS;

compare the location of the material dispensing nozzle in the coordinate system other than GPS to a desired roadway mark path according to the coordinate system other than GPS; and a control system, including a computer, configured to position the material dispensing nozzle over the predetermined roadway mark path by moving the paint carriage based on the comparison of the location of the paint carriage in the coordinate system other than GPS to a desired roadway mark path according to the coordinate system other than GPS.

18. A vehicle mounted global positioning system (GPS)-based control system for positioning a material dispensing nozzle over a predetermined roadway mark path located on a roadway surface comprising:

a vehicle having an attached paint carriage which is laterally movable with respect to the vehicle;

a material dispensing nozzle attached to the paint carriage;

a first GPS antenna mounted on the vehicle;

a second GPS antenna mounted on the vehicle;

a third GPS antenna mounted on the vehicle;

a first GPS receiver responsive to the first GPS antenna;

a second GPS receiver responsive to the second GPS antenna;

a third GPS receiver responsive to the third GPS antenna;

a first signal processor responsive to the first GPS receiver for determining a geographical location of the first GPS antenna;

a second signal processor responsive to the second GPS receiver for determining the geographical location of the second GPS antenna;

a third signal processor responsive to the third GPS receiver for determining the geographical location of the third GPS antenna, a laser attached to the paint carriage for projecting a line pattern on the roadway surface;

an imager device configured to detect the projected line pattern;

a GPS location processor responsive to the first signal processor and to the imager device for determining an absolute GPS location of the material dispensing nozzle;

a coordinate transform processor for transforming the absolute GPS location of the material dispensing nozzle into a location in a coordinate system other than GPS;

a comparator device for comparing the location of the material dispensing nozzle in the coordinate system other than GPS to a desired roadway mark path according to the coordinate system other than GPS; and a control system, including a computer, responsive to the comparator device for controllably positioning the material dispensing nozzle over the predetermined roadway mark path by laterally moving the paint carriage.

* * * * *

UNITED STATES PATENT AND TRADEMARK OFFICE
CERTIFICATE OF CORRECTION

PATENT NO. : 10,392,756 B2
APPLICATION NO. : 15/548356
DATED : August 27, 2019
INVENTOR(S) : Dolinar et al.

Page 1 of 1

It is certified that error appears in the above-identified patent and that said Letters Patent is hereby corrected as shown below:

In the Specification

At Column 26, the paragraph starting at Line 36 should read:
-- The coordinate transform program 826 inputs absolute GPS coordinates and transforms these coordinates to another coordinate system. For example the coordinate transform program 826 may input 3-dimensional GPS coordinates (LLA or ECEF data) and output equivalent 2-dimensional UTM coordinates. --

Signed and Sealed this
Twenty-sixth Day of November, 2019

Andrei Iancu
*Director of the United States Patent and Trademark Office*